(12) United States Patent
Chaponniere et al.

(10) Patent No.: US 10,595,238 B2
(45) Date of Patent: Mar. 17, 2020

(54) SYSTEMS AND METHODS TO IMPROVE MOBILITY FOR A MOBILE DEVICE IN ECALL-ONLY MODE

(71) Applicant: QUALCOMM Incorporated, San Diego, CA (US)

(72) Inventors: Lenaig Genevieve Chaponniere, La Jolla, CA (US); Stephen William Edge, Escondido, CA (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/043,096

(22) Filed: Jul. 23, 2018

(65) Prior Publication Data

US 2019/0037451 A1 Jan. 31, 2019

(30) Foreign Application Priority Data

Jul. 25, 2017 (GR) .............................. 20170100351

(51) Int. Cl.
*H04W 36/00* (2009.01)
*H04L 29/06* (2006.01)
(Continued)

(52) U.S. Cl.
CPC ..... *H04W 36/0022* (2013.01); *H04L 65/1006* (2013.01); *H04L 65/1016* (2013.01);
(Continued)

(58) Field of Classification Search
CPC . H04W 36/0022; H04W 76/38; H04W 76/50; H04W 36/14; H04W 48/18;
(Continued)

(56) References Cited

U.S. PATENT DOCUMENTS

| 2009/0253403 | A1 | 10/2009 | Edge et al. | |
| 2018/0263068 | A1* | 9/2018 | Chiang | H04W 36/0022 |
| 2018/0375902 | A1* | 12/2018 | Wong | H04W 52/02 |

OTHER PUBLICATIONS

Deutsche Telekom: "Clarification of Mobility Management Procedures for UEs in eCall Mode", 3GPP Draft; 22101_CR0519R1_(REL-14)_S1-162532, 3rd Generation Partnership Project (3GPP), Mobile Competence Centre; 650, Route Des Lucioles; F-06921 Sophia-Antipolis Cedex; France, vol. SA WG1, no. San Francisco, CA, US; Aug. 22, 2016-Aug. 26, 2016, Sep. 13, 2016 (Sep. 13, 2016), 2 Pages, XP051153660, Retrieved from the Internet: URL:http://www.3gpp.org/ftp/Meetings_3GPP_SYNC/SA/Docs/ [retrieved on Sep. 13, 2016].

(Continued)

*Primary Examiner* — Melvin C Marcelo
(74) *Attorney, Agent, or Firm* — Thein T. Nguyen

(57) ABSTRACT

Disclosed are techniques for supporting inter-RAT mobility of a UE in an eCall-only mode. In an aspect, the UE establishes a communication session for an eCall or a test/reconfiguration call, releases the communication session for the eCall or test/reconfiguration call, starts a timer based on at least one of (i) release, by the UE, of a PS signaling connection for a UMTS access for the communication session, (ii) expiration at the UE of a READY timer for GPRS, wherein the READY timer was started by the UE following a PS handover of the communication session from an LTE access to a GSM-GPRS access, (iii) intersystem change by the UE from an LTE access to a GSM-GPRS access or a UMTS access, or (iv) intersystem change by the UE from a GSM access or a UMTS access to an LTE access, and performs an eCall inactivity procedure when the timer expires.

40 Claims, 10 Drawing Sheets

(51) Int. Cl.
*H04W 76/38* (2018.01)
*H04W 36/14* (2009.01)
*H04W 48/18* (2009.01)
*H04W 76/50* (2018.01)

(52) U.S. Cl.
CPC ...... *H04L 65/1069* (2013.01); *H04L 65/1073* (2013.01); *H04W 36/14* (2013.01); *H04W 76/38* (2018.02); *H04W 48/18* (2013.01); *H04W 76/50* (2018.02)

(58) Field of Classification Search
CPC ............. H04L 65/1006; H04L 65/1016; H04L 65/1069; H04L 65/1073
See application file for complete search history.

(56) References Cited

OTHER PUBLICATIONS

Huawei, et al., "Inter-System Change for an eCall only UE", 3GPP Draft; C1-172202_24.301_ECALL_INTER-RAT Change, 3rd Generation Partnership Project (3GPP), Mobile Competence Centre, 650, Route Des Lucioles, F-06921 Sophia-Antipolis Cedex, France, vol. CT WG1, no. Zhangjiajie, P.R of China; May 15, 2017-May 19, 2017, May 14, 2017 (May 14, 2017), 4 Pages, XP051270445, Retrieved from the Internet: URL: http://www.3gpp.org/ftp/Meetings_ 3GPP_SYNC/CTI/Docs/ [retrieved on May 14, 2017].

International Search Report and Written Opinion—PCT/US2018/ 043408—ISA/EPO—dated Oct. 5, 2018.

"Qualcomm Incorporated, et al.," "Handling of Inter-RAT Mobility for MS in eCall only Mode Capable of eCall over IMS", 3GPP Draft; 24008_CR3080R1_(REL-14) C1-173373, 3rd Generation Partnership Project (3GPP), Mobile Competence Centre; 650, Route Des Lucioles; F-06921 Sophia-Antipolis Cedex; France, vol. CT WG1, no. Krakow (Poland); Aug. 21, 2017-Aug. 25, 2017, Sep. 10, 2017 (Sep. 10, 2017), 16 Pages, XP051314274, Retrieved from the Internet: URL: http://www.3gpp.org/ftp/Meetings_3GPP_SYNC/ CT/Docs/ [retrieved on Sep. 10, 2017].

Qualcomm Incorporated, et al., "Handling of Inter-RAT Mobility for UE in eCall only Mode Capable of eCall over IMS", 3GPP Draft; 24301_CR2905R2_(REL-14)_C1-173776, 3rd Generation Partnership Project (3GPP), Mobile Competence Centre; 650, Route Des Lucioles; F-06921 Sophia-Antipolis Cedex; France, vol. CT WG1, no. Krakow (Poland); Aug. 21, 2017-Aug. 25, 2017, Sep. 10, 2017 (Sep. 10, 2017), 10 Pages, XP051314359, Retrieved from the Internet: URL: http://www.3gpp.org/ftp/Meetings_3GPP_SYNC/ CT/Docs/ [retrieved on Sep. 10, 2017].

Qualcomm Incorporated: "Inter-RAT Mobility for UE in eCall only Mode Capable of eCall Over IMS", 3GPP Draft; C1-173132, 3rd Generation Partnership Project (3GPP), Mobile Competence Centre; 650, Route Des Lucioles; F-06921 Sophia-Antipolis Cedex; France, vol. CT WG1, no. Krakow (Poland); Aug. 21, 2017-Aug. 25, 2017, Aug. 20, 2017 (Aug. 20, 2017), 6 Pages, XP051313180, Retrieved from the Internet: URL: http://www.3gpp.org/ftp/Meetings_ 3GPP_SYNC/CT1/Docs/ [retrieved on Aug. 20, 2017].

* cited by examiner

SYSTEMS AND METHODS TO IMPROVE MOBILITY FOR A MOBILE DEVICE IN ECALL-ONLY MODE

CROSS-REFERENCE TO RELATED APPLICATIONS

The present Application for Patent claims the benefit of Greek Patent Application No. 20170100351, entitled "SYSTEMS AND METHODS TO IMPROVE MOBILITY FOR A MOBILE DEVICE IN ECALL-ONLY MODE," filed Jul. 25, 2017, assigned to the assignee hereof, and expressly incorporated herein by reference in its entirety.

INTRODUCTION

1. Field of the Disclosure

Aspects of this disclosure relate generally to telecommunications, and more particularly to inter-RAT (Radio Access Technology) mobility for a user equipment (UE) or other mobile device in eCall-only mode.

2. Background of the Disclosure

In 1999, the European Commission started an initiative to improve road safety via automated emergency calls (referred to as "eCall") from vehicles following an accident or other emergency situation. In 2006, GSM Europe completed a study of possible solutions for the transfer of a minimum set of data (MSD) from an In Vehicle System (IVS) to a Public Safety Answering Point (PSAP) during an eCall and recommended an in-band modem solution. From 2008 to 2009, a selected in-band modem solution and support for eCall-only mode were standardized in 3GPP for Global System for Mobile Communications (GSM) and Universal Mobile Telecommunication System (UMTS) in Release 8, e.g., in Technical Specifications (TSs) 21.101, 24.008, 26.267. This release did not include support for Internet Protocol (IP) Multimedia System (IMS) emergency calls; rather, the solution was based on circuit-switched (CS) emergency calls (3GPP TS 12). The Release 8 solution is referred to as "eCall over CS," "in-band eCall," "CS eCall," or "eCall in the CS domain."

In Release 14, 3GPP specified a packet-switched (PS)-based version of eCall using emergency bearer services over IMS in Evolved Universal Terrestrial Radio Access Network (E-UTRAN)—e.g., in 3GPP TSs 21.101, 23.401, and 24.301, incorporated by reference herein in their entirety. The Release 14 solution is referred to as "eCall over IMS," "Next Generation (NG) eCall," or "eCall in the PS domain."

For both eCall over CS and eCall over IMS, a special configuration mode called "eCall-only mode" was specified such that when a UE is configured in eCall-only mode via a Universal Subscriber Identity Module (USIM), the UE does not perform mobility management procedures, including registration on a Public Land Mobile Network (PLMN), except when attempting to initiate and then during an eCall, or to initiate and then during a test or reconfiguration call upon request from the user. Additionally, for UEs that have the ability to be called back by the PSAP, the UE is capable of continuing mobility management procedures for a limited duration following the termination of the eCall or test/reconfiguration call. After this limited duration (identified by standardized inactivity timers), the UE de-registers from the network. The purpose of this special configuration mode is to avoid having eCall capable UEs residing in vehicles loading the network with mobility management procedures that are unnecessary, since these UEs do not need to access the network or be reachable by the network except when they need to initiate an eCall or a test/reconfiguration call.

When eCall was specified in Release 8, the only available version of eCall was eCall over CS. It was therefore assumed that a UE in eCall-only mode would only perform CS calls (either CS eCalls, or CS test/reconfiguration calls), and thus only CS-specific procedures were defined for UEs in eCall-only mode. When eCall over IMS was specified in Release 14, to address the fact that Voice over LTE (VoLTE) coverage would not be available everywhere for quite some time still, 3GPP mandated that a UE supporting eCall over IMS must also support eCall over CS. This requirement means that a UE that supports eCall over IMS must be capable of both PS and CS services.

It was acknowledged that a UE may also perform inter-Radio Access Technology (RAT) mobility (e.g., a handover, in either idle or connected mode, between an E-UTRAN and a UTRAN or GSM/GSM Evolution (EDGE) Radio Access Network (GERAN)) since changes were made to enable PS to CS Single Radio Voice Call Continuity (SRVCC) handover of an eCall over IMS. However, no consideration was given to mobility management procedures during and after inter-RAT mobility.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for supporting inter-RAT mobility of a UE in an eCall-only mode includes establishing, by the UE, a communication session for a first eCall or a first test/reconfiguration call, releasing, by the UE, the communication session for the first eCall or the first test/reconfiguration call, starting, by the UE, a first timer based on at least one of (i) release, by the UE, of a PS signaling connection for a UMTS access for the communication session, (ii) expiration at the UE of a READY timer for General Packet Radio Service (GPRS), wherein the READY timer was started by the UE following a PS handover of the communication session from an LTE access to a GSM-GPRS access, (iii) intersystem change by the UE from an LTE access to a GSM-GPRS access or a UMTS access, or (iv) intersystem change by the UE from a GSM access or a UMTS access to an LTE access, and performing, by the UE, an eCall inactivity procedure when the first timer expires, wherein the eCall inactivity procedure comprises detaching from a wireless network and refraining from transmitting signaling to the wireless network in the absence of a second eCall or a second test/reconfiguration call.

In an aspect, an apparatus for supporting inter-RAT mobility of a UE in an eCall-only mode includes at least one processor of the UE configured to: establish a communication session for a first eCall or a first test/reconfiguration call, release the communication session for the first eCall or the first test/reconfiguration call, start a first timer based on at least one of (i) release, by the UE, of a PS signaling connection for a UMTS access for the communication session, (ii) expiration at the UE of a READY timer for GPRS, wherein the READY timer was started by the UE following a PS handover of the communication session from an LTE access to a GSM-GPRS access, (iii) intersystem change by the UE from an LTE access to a GSM-GPRS access or a UMTS access, or (iv) intersystem change by the UE from a GSM access or a UMTS access to an LTE access, and perform an eCall inactivity procedure when the first timer expires, wherein the eCall inactivity procedure comprises detaching from a wireless network and refraining from transmitting signaling to the wireless network in the absence of a second eCall or a second test/reconfiguration call.

In an aspect, a non-transitory computer-readable medium storing computer-executable instructions for supporting inter-RAT mobility of a UE in an eCall-only mode includes computer-executable instructions comprising at least one instruction instructing the UE to establish a communication session for a first eCall or a first test/reconfiguration call, at least one instruction instructing the UE to release the communication session for the first eCall or the first test/reconfiguration call, at least one instruction instructing the UE to start a first timer based on at least one of (i) release, by the UE, of a Packet Switched (PS) signaling connection for a UMTS access for the communication session, (ii) expiration at the UE of a READY timer for GPRS, wherein the READY timer was started by the UE following a PS handover of the communication session from an LTE access to a GSM-GPRS access, (iii) intersystem change by the UE from an LTE access to a GSM-GPRS access or a UMTS access, or (iv) intersystem change by the UE from a GSM access or a UMTS access to an LTE access, and at least one instruction instructing the UE to perform an eCall inactivity procedure when the first timer expires, wherein the eCall inactivity procedure comprises detaching from a wireless network and refraining from transmitting signaling to the wireless network in the absence of a second eCall or a second test/reconfiguration call.

In an aspect, an apparatus for supporting inter-RAT mobility of a UE in an eCall-only mode includes means for processing of the UE configured to: establish a communication session for a first eCall or a first test/reconfiguration call, release the communication session for the first eCall or the first test/reconfiguration call, start a first timer based on at least one of (i) release, by the UE, of a PS signaling connection for a UMTS access for the communication session, (ii) expiration at the UE of a READY timer for GPRS, wherein the READY timer was started by the UE following a PS handover of the communication session from an LTE access to a GSM-GPRS access, (iii) intersystem change by the UE from an LTE access to a GSM-GPRS access or a UMTS access, or (iv) intersystem change by the UE from a GSM access or a UMTS access to an LTE access, and perform an eCall inactivity procedure when the first timer expires, wherein the eCall inactivity procedure comprises detaching from a wireless network and refraining from transmitting signaling to the wireless network in the absence of a second eCall or a second test/reconfiguration call.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

Figure 1A:
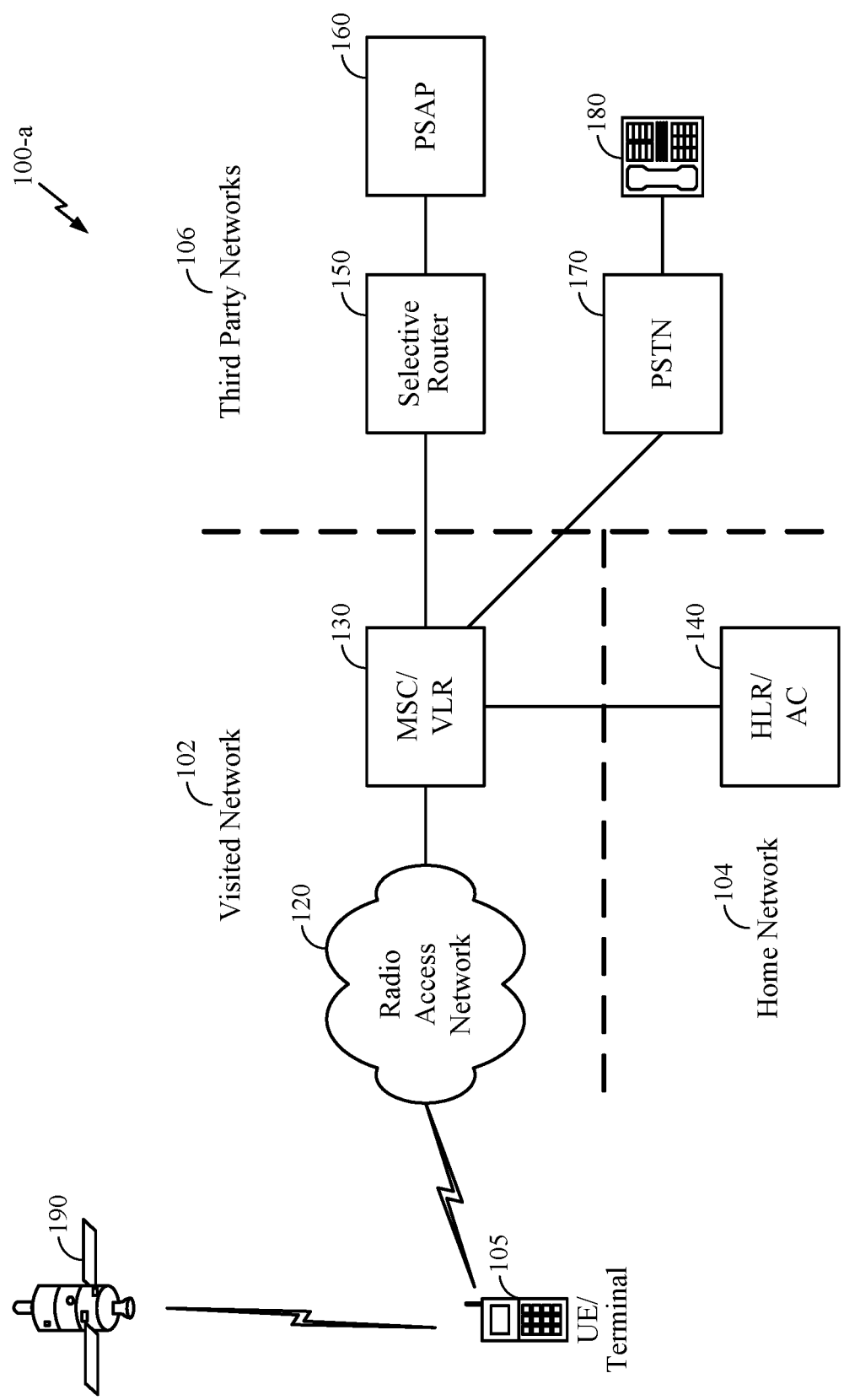
FIGS. 1A-1C illustrate exemplary wireless communications systems in which the techniques described herein can be practiced.

Like reference numbers and alphanumeric sequences in the various drawings indicate like elements, in accordance with certain example implementations. In addition, multiple instances of an element may be indicated by following a first number for the element with a hyphen and a second number or a letter. For example, multiple instances of an element 160 may be indicated as 160-1, 160-2, 160-3, etc. or as 160-a, 160-b, 160-c, etc. When referring to such an element using only the first number, any instance of the element is to be understood (e.g., elements 160 in the previous example would refer to elements 160-1, 160-2, and 160-3 and/or to elements 160-a, 160-b, and 160-c).

DETAILED DESCRIPTION

Disclosed are techniques for supporting improved mobility of a UE in an eCall-only mode. In an aspect, the UE establishes a communication session for a first eCall or a first test/reconfiguration call, releases the communication session for the first eCall or the first test/reconfiguration call, starts a first timer based on at least one of (i) release, by the UE, of a PS signaling connection for a UMTS access for the communication session, (ii) expiration at the UE of a READY timer for GPRS, wherein the READY timer was started by the UE following a PS handover of the communication session from an LTE access to a GSM-GPRS access, (iii) intersystem change by the UE from an LTE access to a GSM-GPRS access or a UMTS access, or (iv) intersystem change by the UE from a GSM access or a UMTS access to an LTE access, and performs an eCall inactivity procedure when the first timer expires, wherein the eCall inactivity procedure comprises detaching from a wireless network and refraining from transmitting signaling to the wireless network in the absence of a second eCall or a second test/reconfiguration call.

These and other aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

A telematics-enhanced emergency call may be an emergency call instigated from a vehicle in which additional telematics data is transferred from a user equipment (UE) to a Public Safety Answering Point (PSAP) or to a Third Party Service Provider (TSP). The telematics data may provide additional information related to the emergency call, such as an identification for the vehicle, the type of the vehicle, the current location of the vehicle, recent previous locations of the vehicle, the number of occupants of the vehicle, any dangerous cargo in the vehicle, and/or the like. A PSAP may use the telematics data to help determine a suitable public safety response. A telematics-enhanced emergency call may be referred to as an "eCall" (e.g., if made in the European Union (EU)), an "eCall over CS" (e.g., when originated from a circuit switched (CS) wireless network) or as an "eCall over IMS" (e.g., when originated from an IP Multimedia System (IMS), such as a 3GPP Long Term Evolution (LTE) network). An "eCall over CS" may also be referred to as an "in-band eCall," a "CS eCall," or as an "eCall in the CS domain." An "eCall over IMS" may be referred to as a "Next Generation (NG) eCall" or as an "eCall in the Packet Switched (PS) domain." The term "eCall" may typically be used to refer to a telematics-enhanced emergency call that can either be an eCall over IMS or an eCall over CS. The term "eCall" may also be used to refer specifically to an eCall over IMS or eCall over CS (but not to both) in a context where the type of eCall is already known. A UE that originates an eCall may be part of an IVS and may also be referred to as a Mobile Station (MS), mobile device, wireless device, wireless terminal, terminal, etc. The telematics data may be referred to as a "Minimum Set of Data" (MSD) (e.g., for an eCall instigated in the EU) or as a "Vehicular Emergency Data Set" (VEDS) (e.g., for a telematics-enhanced emergency call in North America).

FIG. 1A shows an example wireless communications system 100-*a*, which may include a visited network 102, a home network 104, and third party networks 106. Visited network 102 may also be referred to as a Visited Public Land Mobile Network (V-PLMN), a serving network, etc. Home network 104 may also be referred to as a Home PLMN (H-PLMN). Visited network 102 may be a serving network for a UE 105, which may be roaming from its home network 104, as assumed in much of the description below. Visited network 102 and home network 104 may be the same network if the UE 105 is not roaming Wireless communication system 100-*a* may be applicable to an eCall over CS.

Visited network 102 may include a radio access network (RAN) 120, a Mobile Switching Center (MSC)/Visitor Location Register (VLR) 130 (which is also referred to herein as MSC 130), and other network entities not shown in FIG. 1A for simplicity. Visited network 102 may comprise one or more of a GSM network, a Wideband Code Division Multiple Access (WCDMA) network, a General Packet Radio Service (GPRS) access network, a Long Term Evolution (LTE) network, a Code Division Multiple Access (CDMA) 1× network, a High Rate Packet Data (HRPD) network, an Ultra Mobile Broadband (UMB) network, a Fifth Generation (5G) New Radio (NR) network, etc. GSM, WCDMA, GPRS, LTE and NR are described in documents from an organization named "3rd Generation Partnership Project" (3GPP). CDMA 1× and HRPD are part of cdma2000, and cdma2000 and UMB are described in documents from an organization named "3rd Generation Partnership Project 2" (3GPP2). RAN 120 may be a GERAN, a Universal Terrestrial Radio Access Network (UTRAN) or Evolved UTRAN (E-UTRAN). MSC 130 may perform switching functions for circuit-switched calls and may also route Short Message Service (SMS) messages. VLR 130 may store registration information for terminals that have registered with visited network 102.

Home network 104 may include a Home Location Register (HLR)/Authentication Center (AC) 140 and other network entities not shown in FIG. 1A for simplicity. HLR 140 may store subscription information for terminals, such as UE 105, that have service subscription with home network 104. AC 140 may perform authentication for terminals having service subscription with home network 104.

Third party networks 106 may include a selective router 150 (e.g., a PSAP selective router), a PSAP 160, a Public Switched Telephone Network (PSTN) 170, and possibly other network entities not shown in FIG. 1A. Selective router 150 may route calls between MSC 130 and PSAP 160. PSAP 160 may be responsible for answering emergency calls and may also be referred to as an Emergency Center (EC). PSAP 160 may be operated or owned by a government agency, e.g., a county or city. PSTN 170 may provide telephone services for conventional wireline telephones, such as a telephone 180.

FIG. 1A shows only some of the network entities that may be present in visited network 102 and home network 104. For example, visited network 102 may include network entities supporting packet-switched calls and other services as well a location server to assist in obtaining terminal location.

UE 105 may be stationary or mobile and may also be referred to as a mobile station (MS) in GSM and CDMA 1×, a UE in WCDMA and LTE, an access terminal (AT) in HRPD, a SUPL enabled terminal (SET) for Secure User Plane Location (SUPL), a subscriber unit, a station, a terminal, etc. UE 105 may be a device such as a cellular phone or other wireless communication device, personal communication system (PCS) device, personal navigation device (PND), Personal Information Manager (PIM), Personal Digital Assistant (PDA), laptop computer, tablet computer, or other suitable mobile device that is capable of receiving wireless communication and/or navigation signals. UE 105 may also be a device that communicates with a PND, such as by short-range wireless, infrared, wireline or other connection—regardless of whether satellite signal reception, assistance data reception, and/or position-related processing occurs at the device or at the PND. Also, UE 105 is intended to include all devices, including wireless communication devices, computers, laptops, etc. that are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also included. UE 105 may also be, or be part of, a dedicated In-Vehicle System (IVS), which may be permanently attached to (and possibly part of) a vehicle.

UE 105 may have a service subscription with home network 104 and may be roaming in visited network 102, as shown in FIG. 1A. UE 105 may receive signals from RAN 120 in visited network 102 or may communicate with the RAN 120 to obtain communication services. UE 105 may also communicate with home network 104 for communication services when not roaming (not shown in FIG. 1A). UE 105 may also receive signals from one or more space vehicles (SVs) 190, which may be part of a satellite positioning system (SPS). An SPS typically includes a system of transmitters positioned to enable entities to determine their location on or above the Earth based, at least in part, on signals received from transmitters of the one or more SVs 190. Such transmitters typically transmit a signal marked with a repeating pseudo-random noise (PN) code of a set number of chips and may be located on ground based control stations, UE, and/or space vehicles. In a particular example, such transmitters may be located on Earth orbiting SVs 190. For example, an SV 190 in a constellation of a Global Navigation Satellite System (GNSS), such as the Global Positioning System (GPS), Galileo, GLONASS, or Beidou, may transmit a signal marked with a PN code that is distinguishable from PN codes transmitted by other SVs 190 in the constellation (e.g., using different PN codes for each satellite as in GPS or using the same code on different frequencies as in GLONASS). UE 105 may use measurements from SVs 190 to maintain an accurate current location of UE 105 and may include this location (e.g., latitude and longitude coordinates) in any telematics data (e.g., MSD) that is sent to PSAP 160 in association with an eCall.

In accordance with certain aspects, the techniques presented herein are not restricted to global systems (e.g., GNSS) for SPS. For example, the techniques provided herein may be applied to or otherwise enabled for use in various regional systems, such as, e.g., the Quasi-Zenith Satellite System (QZSS) over Japan, the Indian Regional Navigational Satellite System (IRNSS) over India, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS. UE 105 may measure signals from SVs 190 and obtain pseudo-range measurements for the SVs 190. UE 105 may also measure signals from base stations in RAN 120 and obtain timing and/or signal strength measurements for the base stations. The pseudo-range measurements, timing measurements and/or signal strength measurements may be used to derive a position estimate for UE 105. A position estimate may also be referred to as a location estimate, a location, a position, a position fix, etc.

UE 105 may have an International Mobile Equipment Identity (IMEI), which is a unique number assigned to the terminal. UE 105 may be used for a service subscription of a user. The service subscription may be associated with an International Mobile Subscriber Identity (IMSI), which is a unique number assigned to a subscription for GSM, UMTS, LTE and other networks. The service subscription may also be associated with a Mobile Station International Subscriber Directory Number (MSISDN), which is a telephone number for the service subscription. The IMSI may be used as a key for the service subscription in a subscriber database in HLR 140. The MSISDN may be dialed by other users to connect calls to UE 105 used for the service subscription. The IMSI, the MSISDN, and other subscription information may be stored in a Subscriber Identity Module (SIM) or a Universal Subscriber Identity Module (USIM), which may be inserted into UE 105. UE 105 may also have no SIM/USIM, in which case UE 105 may have only an IMEI but no IMSI or MSISDN.

Wireless networks may be required to support different types of emergency calls. One type may include "normal" emergency calls originated by users dialing well-known emergency numbers such as "911" in North America and "112" in Europe. Another type may include eCalls, which are emergency calls that may have the characteristics described above, but are automatically or manually triggered emergency related calls from a terminal associated with a vehicle to a PSAP or TSP. This applies in Europe where the term "eCall" denotes a particular kind of emergency call from an IVS to a PSAP over a wireless communication network such as a GSM, UMTS, or LTE network. Support for eCalls may be required by the European Union (EU) and by other world regions and/or countries. An eCall may be different from a normal emergency call in the manner in which the call is placed and the additional emergency related telematics data that may be sent to establish the eCall and used to process the eCall.

An eCall may be instigated from an IVS in a vehicle either automatically when sensors detect an emergency situation (e.g., deployment of airbags) or manually by invocation by the driver or a passenger in the vehicle. As part of the eCall, telematics data, referred to as an MSD, is transferred from the UE component of the IVS to the PSAP either during eCall establishment or immediately (e.g., a few seconds) after eCall establishment. The MSD can include information helpful or critical to the PSAP (which may not otherwise be obtainable, in the case where a driver or passenger in a vehicle is unconscious or otherwise unable to provide information vocally), including, for example: a location of the vehicle, vehicle identification information, type of vehicle, possible hazardous cargo in the vehicle, number of seatbelts being used (and/or other information that may be indicative of the number of passengers in the vehicle), sensor information, and the like. Following successful transfer of the MSD, the PSAP may return metadata to the IVS confirming the successful transfer. At some later point in the call, the PSAP may send metadata to the IVS to request the IVS to send an updated MSD to the PSAP (e.g., containing a new location for the vehicle and/or an indication of a different number of vehicle occupants). The MSD and associated metadata (e.g., MSD confirmation or MSD request) may be transferred using in-band or out-of-band means that may depend on whether the wireless communication system that is being used supports or does not support out-of-band transfer.

With in-band transfer, the MSD may be transferred using the voice communications path between the UE and PSAP using an in-band data modem at the UE and the PSAP. At the UE, the in-band modem may encode MSD data (e.g., MSD data bits) as audio signals. At the PSAP, the in-band modem may decode the audio signals into the original MSD data. With our-of-band transfer, the MSD data may be transferred as part of a signaling message (e.g., a Session Initiation Protocol (SIP) signaling message) which may be transferred from the UE to the PSAP using the Internet Protocol (IP) and separately from the transfer of voice communication between the UE and the PSAP.

With NG eCall, transfer of the MSD typically occurs using out-of-band means and may be applicable when the wireless communication system uses an IP-based network architecture such as LTE. Out-of-band transfer may typically be both faster and more reliable than transferring the MSD by in-band means using the voice media path from the IVS to the PSAP, which may need to be supported for eCall over older technologies such as GSM or UMTS. However, out-of-band transfer of MSD (e.g., using SIP or using a separate dedicated data channel) may depend on a PSAP being IP (e.g., SIP) capable.

If both eCall over IMS and eCall over CS are available (e.g., from one or more networks with 2G/3G and 4G access), it may be preferable for a UE to use eCall over IMS instead of eCall over CS. Some advantages of eCall over IMS are described below in Table 1.

that: i) supports eCall over IMS; ii) can interpret the telematics data (e.g., MSD), that may be included in the SIP INVITE sent by a UE to establish the eCall over IMS; and iii) can support the associated signaling (e.g., MSD acknowledgement, etc.). The network may advertise its support for eCall over IMS via a broadcast indicator included in broadcast system information (e.g., in a system information block (SIB), etc.). This enables UEs to know in advance which networks (e.g., PLMNs), support eCall over IMS, thereby avoiding delay in selecting a network that supports eCall over IMS. This may not guarantee that the PSAP will always support eCall over IMS, since it is possible that (e.g., when an eCall over IMS capable PSAP is temporarily not available), the eCall is routed by a network that indicates support for eCall over IMS to a legacy PSAP in the CS domain that may support in-band transfer of the MSD but not IMS transfer of the MSD. However, this scenario may be very rare since a network may advertise support for eCall over IMS only when both the network and a PSAP to which an eCall can be routed both support eCall over IMS.

In some examples, some of the networks (e.g., visited network 102, home network 104, etc.) available to the UE 105 may be capable of eCall over IMS, while others may be capable of eCall over CS only, and yet others may not support eCall over IMS or eCall over CS (e.g., may support emergency calling only). In case neither a network supporting eCall over IMS, nor a network with 2G/3G CS access supporting eCall over CS, are available, a next fallback option may be for the UE to make an IMS emergency call over LTE and IMS and to include an indication (e.g., in a SIP INVITE message) that this is an eCall. In the case of such an IMS emergency call, the MSD may not be transferred, but the network may route the emergency call to a PSAP that supports an eCall over CS due to the indication that this is an eCall. This may enable the MSD to be transferred by in-band means, as for eCall over CS, after the emergency call is established, although this may be less reliable and more prone to delay and interruption of the voice path than

TABLE 1

| Criterion | eCall over IMS | eCall over CS |
| --- | --- | --- |
| MSD transfer | There is no interruption of the voice path due to the MSD transfer, since the MSD is included as part of the SIP signaling establishing the eCall. | The voice path between the user of the UE and PSAP operator may be interrupted (e.g., blocked) for 5-10 seconds while MSD is transferred in-band over the voice path. |
| MSD reliability | The MSD is sent out of band using SIP signaling over an emergency bearer with a Quality of Service (QoS) Class Identifier (QCI) equal to 5, which provides high transfer reliability. | The MSD is sent using a data modem over the voice path which can lead to corruption or loss of the MSD. Even with retransmission, MSD transfer may not always be successful. |
| MSD Delay | MSD transfer time is effectively zero as the MSD is transferred in the initial SIP INVITE message. In addition a PSAP that is congested can still receive the MSD when a voice call cannot be established which can allow public safety dispatch to the location of the UE. | MSD transfer occurs after an eCall over CS has been established and may take 5 to 10 seconds. In addition, a PSAP that is congested and needs to reject an eCall over CS call request may not be able to receive the MSD. |

To enable eCall over IMS, both the UE side and the network side may support eCall over IMS. In particular, a network may support routing an eCall over IMS to a PSAP eCall over IMS, as described in Table 1. In addition, because LTE access may be used rather than 2G/3G CS access, the audio tones generated by an in-band data modem to transfer the MSD in-band may undergo transcoding from Voice over IP (VoIP) to CS voice at a Media Gateway (MGW), which may further degrade in-band MSD transfer reliability and further increase delay. For these reasons, the fall back option of using an IMS emergency call over LTE access may be considered as a solution of last resort.

Figure 1B:
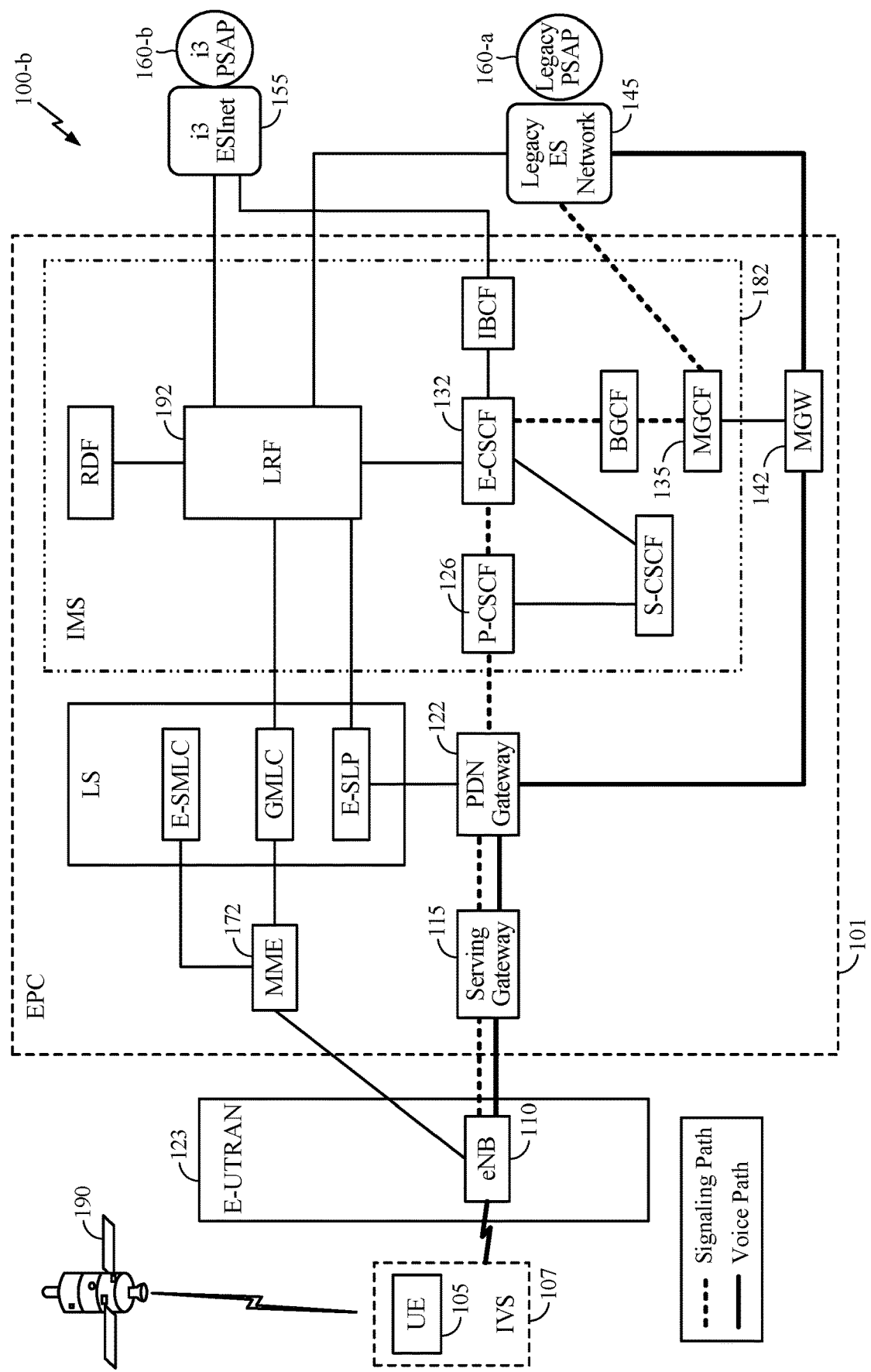

FIG. 1B is a block diagram illustrating an LTE/LTE-Advanced network architecture of a wireless communications system 100-*b*, which may be an example of aspects of the wireless communications system 100-*a*, in accordance with various aspects of the disclosure. Wireless communications system 100-*b* may be applicable to an eCall over IMS. Among other components, the system includes a UE 105, which may be incorporated into and/or otherwise connected with an IVS 107, an LTE core network (also referred to as an Evolved Packet Core (EPC)) 101, an E-UTRAN 123, a Legacy Emergency Services (ES) Network 145 with a Legacy PSAP 160-*a*, and a National Emergency Number Association (NENA) i3 Emergency Services IP network (ESInet) 155 with a NENA i3 capable PSAP 160-*b*. The E-UTRAN 123 may include an Evolved Node B (eNodeB, or eNB) 110. Although only one eNB 110 is shown in FIG. 1B, E-UTRAN 123 may include many eNBs 110 (e.g., hundreds or thousands). EPC 101 may include a Serving Gateway (S-GW) 115, a Packet Data Network (PDN) Gateway (PDN-GW) 122, a Mobility Management Entity (MME) 172, a Proxy Call Session Control Function (P-CSCF) 126, an Emergency Call Session Control Function (E-CSCF) 132, a Media Gateway Control Function (MGCF) 135, and a Media Gateway (MGW) 142. In some aspects, the MGCF 135 may be incorporated into or otherwise joined with the MGW 142. In other aspects, such as the example shown in FIG. 1B, they may be separately implemented and/or maintained. As shown, the wireless communications system 100-*b* may comprise other components (some of which are shown in FIG. 1B but which are not discussed in this disclosure), and other aspects may add, omit, join, separate, rearrange, or otherwise alter components depending on desired functionality. Such variations will be recognized by a person of ordinary skill in the art.

In an aspect, EPC 101 combined with E-UTRAN 123 in FIG. 1B may correspond to visited network 102 in FIG. 1A. In this case, E-UTRAN 123 in FIG. 1B may correspond to RAN 120 in FIG. 1A. EPC 101 combined with E-UTRAN 123 may be referred to as an Evolved Packet System (EPS).

The IVS 107 in FIG. 1B may be part of a vehicle (e.g., a car or truck) and may support telematics services for a NG eCall, as described above. The IVS 107 may include the UE 105 as an embedded component or may be connected to (e.g., coupled to) the UE 105 (e.g., via Bluetooth®). The UE 105 may support the signaling and voice transfer functions for NG eCall and CS eCall and may be similar to or the same as other wireless terminals (e.g., a cellular phone or smartphone) in terms of wireless communications capability. The IVS 107 may include other components (not shown in FIG. 1B) such as sensors that may detect different types of emergency situations for the associated vehicle, for which an NG eCall may be needed, such as violent acceleration or deceleration, deployment of airbags, or a fire. The eNB 110 may be a serving eNB for the UE 105 and may provide wireless communications access to the EPC 101 on behalf of UE 105. The MME 172 may be a serving MME for the UE 105 and may support mobility of UE 105 and provision of signaling access and voice bearer paths. The serving gateway 115 and PDN gateway 122 may provide IP based signaling and IP transport support for UE 105—e.g., with PDN gateway 122 assigning an IP address for UE 105 and providing IP access to other entities in LTE network 101, such MGW 142 and P-CSCF 126.

EPC 101 may include, or be connected to, an IMS 182 that may include the P-CSCF 126, E-CSCF 132, MGCF 135, and LRF 192. In one aspect, IMS 182 may be part of EPC 101, as shown in FIG. 1B. In another aspect, however, IMS 182 may not be part of EPC 101 (not shown in FIG. 1B). IMS 182 may support an NG eCall from UE 105 to a PSAP, such as i3 PSAP 160-*b* or legacy PSAP 160-*a*. For example, in the case of an NG eCall from UE 105 to i3 PSAP 160-*b*, a signaling path (not shown in FIG. 1B) from UE 105 may pass through the eNB 110, serving gateway 115, PDN gateway 122, P-CSCF 126, E-CSCF 132, an Interconnection Border Control Function (IBCF), the i3 ESInet 155, and i3 PSAP 160-*b*. In the case of an NG eCall from UE 105 to legacy PSAP 160-*a*, a signaling path from UE 105 (shown in FIG. 1B by the dashed bolded line) may pass through the eNB 110, serving gateway 115, PDN gateway 122, P-CSCF 126, E-CSCF 132, a Breakout Gateway Control Function (BGCF), MGCF 135, the legacy ES Network 145, and legacy PSAP 160-*a*. Elements in IMS 182 may provide call handling and call routing support to enable an NG eCall from UE 105 to either i3 PSAP 160-*b* or legacy PSAP 160-*a*. For example, P-CSCF 126 may detect an NG eCall when instigated by UE 105 (e.g., by receiving, decoding, and interpreting a SIP INVITE message sent by UE 105). E-CSCF 132 may support routing of an NG eCall from UE 105 (e.g., by sending a SIP INVITE from UE 105 received via P-CSCF 126 towards either legacy PSAP 160-*a* via MGCF 135 or i3 PSAP 160-*b* via an IBCF). Location Retrieval Function (LRF) 192 may assist routing of an NG eCall from UE 105 when queried by E-CSCF 132. For example, LRF 192 may determine a location for UE 105 (e.g., from information provided by UE 105 in a SIP INVITE) and may determine a PSAP (e.g., legacy PSAP 160-*a* or i3 PSAP 160-*b*) that supports a CS eCall or an NG eCall for that location and may return an identity or address for this PSAP to E-CSCF 132. MGCF 135 may perform conversion of SIP based signaling, received from or sent to UE 105, to or from signaling used by the legacy ES network 145, such as ISDN (Integrated Services Digital Network) User Part (ISUP) signaling in the case of an NG eCall to legacy PSAP 160-*a*. For example, MGCF 135 may partly convert an NG eCall received from UE 105 into a CS eCall in the case of an NG eCall routed to legacy PSAP 160-*a*.

I3 ESInet 155 may support IP based emergency calls including an NG eCall from UE 105 on behalf of i3 PSAP 160-*b*—e.g., may route an NG eCall from UE 105 to i3 PSAP 160-*b*. Legacy ES network 145 may similarly support CS-based emergency calls on behalf of legacy PSAP 160-*a*, including a CS eCall received via MGCF 135 from UE 105—e.g., may route a CS eCall from UE 105 received via MGCF 135 to legacy PSAP 160-*a*. MGW 142 may convert between VoIP received from or sent to UE 105 and CS-based voice data sent to or received from legacy PSAP 160-*a* in the case of an NG eCall from UE 105 to legacy PSAP 160-*a*.

In the case of an NG eCall from UE 105 to legacy PSAP 160-*a*, the signaling path from the UE 105 to the legacy PSAP 160-*a*, marked with a dashed bolded line, communicatively connects the UE 105 with the legacy PSAP 160-*a* and may be used to transfer signaling messages (e.g., SIP messages, ISUP messages) and/or other signals (e.g., multi-frequency (MF) tones). This path includes the following chain of elements: UE 105, eNB 110, Serving Gateway 115, PDN Gateway 122, P-CSCF 126, E-CSCF 132, MGCF 135, legacy ES Network 145, and legacy PSAP 160-*a*. The voice path (also referred to as a voice media path, media path, data path, voice channel, audio channel, audio path) for an NG eCall from the UE 105 to the legacy PSAP 160-*a*, marked with a solid bolded line, communicatively connects the UE with the legacy PSAP 160-*a*. This path includes the following chain of components: UE 105, eNB 110, Serving Gateway 115, PDN Gateway 122, MGW 142, legacy ES Network 145, and legacy PSAP 160-*a*. Communication of signaling (e.g., SIP messages) from the UE 105 to the MGCF 135 is typically packet switched (e.g., SIP transported using Transmission Control Protocol (TCP) or User Datagram Protocol (UDP) over IP), while communication of signaling from the MGCF 135 to the legacy PSAP 160-*a* may be based on Signaling System number 7 (SS7) (e.g., ISUP) and/or may use in-band MF signaling, although aspects may vary. Communication of voice from the UE 105 to the MGW 142 is typically packet switched (e.g., VoLTE, VoIP), while communication of voice from the MGW 142 to the legacy PSAP 160-*a* is circuit switched (e.g., Pulse Code Modulation (PCM), A-law, PCM µ-law), although aspects may vary.

Figure 1C:
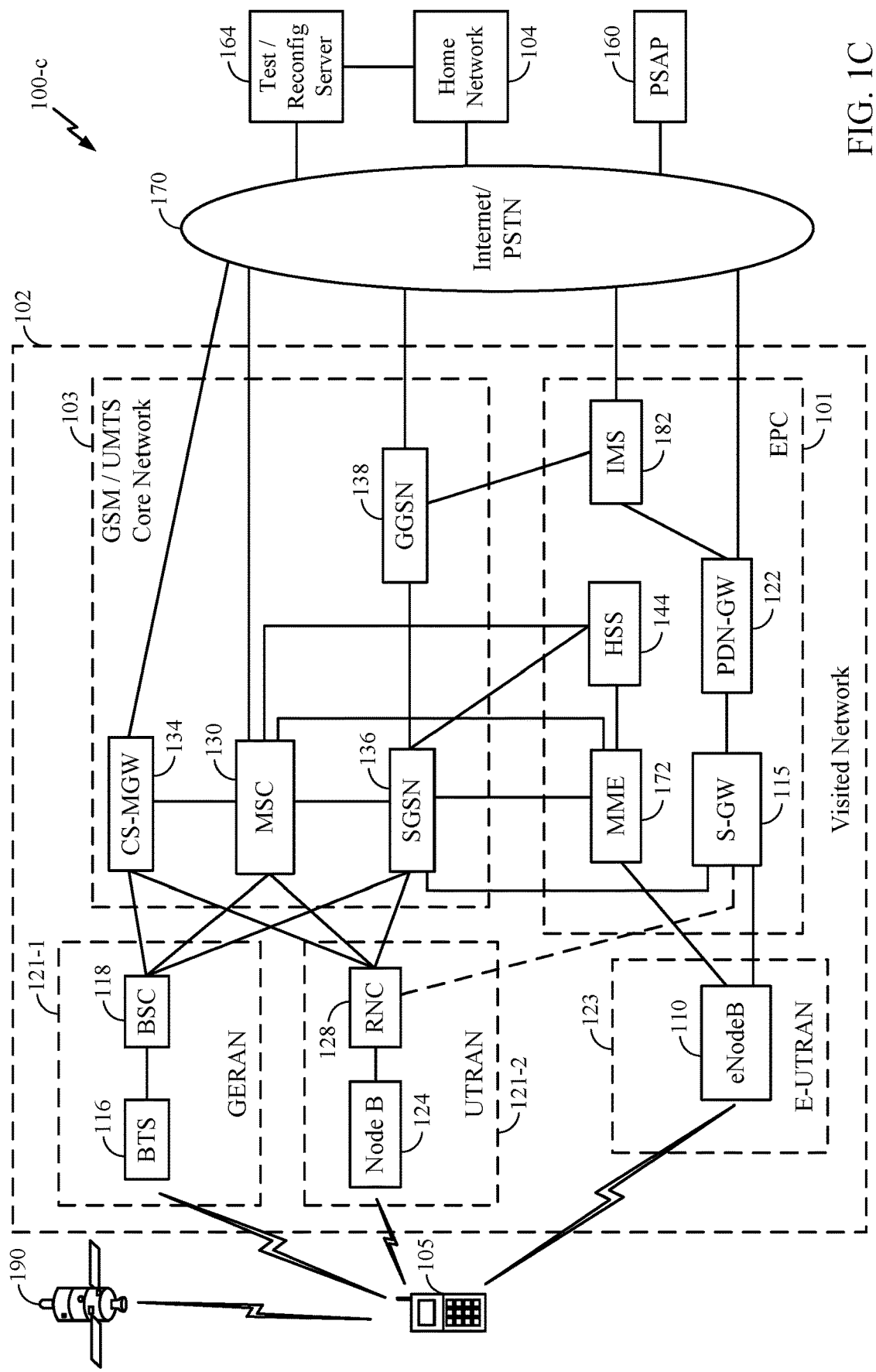

FIG. 1C is a block diagram illustrating a combined LTE/LTE-Advanced and GSM/UMTS network architecture of a wireless communications system 100-*c*, which may be an example of aspects of the wireless communications systems 100-*a* and/or 100-*b*, in accordance with various aspects of the disclosure. The communications system 100-*c* may include visited network 102 which may comprise one or more of a GERAN 121-1, a UTRAN 121-2, an E-UTRAN 123, a GSM/UMTS core network 103, and an EPC 101. The various components of the E-UTRAN 123 and EPC 101 illustrated in FIG. 1C have been discussed above with reference to FIG. 1B.

The UTRAN 121-2 includes one or more Node Bs 124 that are coupled to a Radio Network Controller (RNC) 128 over a wired or wireless backhaul interface. A Node B 124 may support UMTS and/or WCDMA wireless access from a UE 105. A group of Node Bs 124 controlled by a single RNC 128 is collectively referred to as a subnet. As will be appreciated by one of ordinary skill in the art, the UTRAN 121-2 can include multiple RNCs and subnets, and a single RNC is shown in FIG. 1C for the sake of convenience. The RNC 128 is responsible for signaling, establishing and tearing down bearer channels (e.g., data channels) between a Serving GPRS Support Node (SGSN) 136 and/or MSC 130 and a UE 105 served by a Node B 124. If link layer encryption is enabled, the RNC 128 also encrypts the content before forwarding it to the Node Bs 124 for transmission over an air interface. The functions of the Node B 124 and RNC 128 are well-known in the art and will not be discussed further for the sake of brevity.

The GERAN 121-1 includes one or more Base Transceiver Stations (BTSs) 116 that are coupled to a Base Station Controller (BSC) 118 over a wired or wireless backhaul interface. A BTS 116 may support GSM and/or GPRS wireless access from a UE 105. The BSC 118 is responsible for signaling, establishing and tearing down bearer channels (e.g., data channels) between SGSN 136 and/or MSC 130 and a UE 105 served by a BTS 116. The functions of the BTS 116 and BSC 118 are well-known in the art and will not be discussed further for the sake of brevity. Reference herein to a GERAN/UTRAN 121 refers to a RAN 120 that comprises one or both of GERAN 121-1 and UTRAN 121-2. Further, each of GERAN/UTRAN 121, GERAN 121-1 and UTRAN 121-2 may correspond to RAN 120 in FIG. 1A.

In FIG. 1C, the GSM/UMTS core network 103 includes the above-noted SGSN 136 (and potentially a number of other SGSNs as well) and a Gateway GPRS Support Node (GGSN) 138. Generally, GPRS is a set of protocols used for GSM and UMTS access for routing and transporting packets, such as IP packets, containing data, voice, other media, and/or signaling content. A GPRS core network (e.g., the GGSN 138 and one or more SGSNs 136) is the centralized part of the GPRS system and also provides support for WCDMA based 3G access networks. The GPRS core network is an integrated part of the GSM/UMTS core network 103 that provides mobility management, session management, and transport for packet services in GSM and UMTS networks.

The GPRS Tunneling Protocol (GTP) is the main transport protocol of a GPRS core network. Three forms of GTP are used by the GPRS core network; namely, (i) GTP-U, (ii) GTP-C, and (iii) GTP' (GTP Prime). GTP-U is used for transfer of user data in separated tunnels for each packet data protocol (PDP) context. GTP-C is used for control signaling (e.g., setup and deletion of PDP contexts, verification of GPRS Support Node (GSN) reachability, updates or modifications such as when a subscriber moves from one SGSN 136 to another, etc.). GTP' is used for transfer of charging data from GSNs to a charging function.

Referring to FIG. 1C, the GGSN 138 acts as an interface between a GPRS core network and the Internet/PSTN 170. The GGSN 138 extracts packet data with an associated PDP format (e.g., IP or point-to-point (PPP)) from GPRS packets coming from the SGSN 136, and sends the packets out on a corresponding packet data network (e.g., the Internet). In the other direction, the incoming data packets are directed by the GGSN 138 to the SGSN 136, which manages and controls the Radio Access Bearer (RAB) of a target UE 105 served by a Node B 124 or BTS 116. Thereby, the GGSN 138 stores the current SGSN 136 address of the target UE 105 and its associated profile in a location register (e.g., within a PDP context). The GGSN 138 is responsible for IP address assignment and is the default router for a connected UE 105. The GGSN 138 also performs authentication and charging functions.

The SGSN 136 is representative of one of many SGSNs 136 within the GSM/UMTS core network 103, in an example. Each SGSN 136 is responsible for the delivery of data packets from and to the UEs 105 within an associated geographical service area. The tasks of the SGSN 136 includes packet routing and transfer, mobility management (e.g., attach/detach and location management), logical link management, and authentication and charging functions. The location register of the SGSN 136 stores location information (e.g., current cell, current VLR) and user profiles (e.g., IMSI, PDP address(es) used in the packet data network) of all GPRS users registered with the SGSN 136, for example, within one or more PDP contexts for each user or UE. Thus, SGSNs 136 are responsible for (i) de-tunneling downlink GTP packets from the GGSN 138, (ii) uplink tunnel IP packets toward the GGSN 138, (iii) carrying out mobility management as UEs 105 move between SGSN 136 service areas, and (iv) billing mobile subscribers. As will be appreciated by one of ordinary skill in the art, aside from (i)-(iv), SGSNs 136 configured for GSM networks (e.g., GERAN 121-1) have slightly different functionality as compared to SGSNs 136 configured for WCDMA networks (e.g., UTRAN 121-2).

The Node Bs 124 and the RNC 128 communicate with the SGSN 136 via a Radio Access Network Application Part (RANAP) protocol. RANAP operates over an Iu interface (Iu-ps), with a transmission protocol such as Frame Relay or IP. The SGSN 136 communicates with the GGSN 138 via a Gn interface, which is an IP-based interface, and uses the GTP protocol defined above (e.g., GTP-U, GTP-C, GTP', etc.). In the example of FIG. 1C, the Gn interface between the SGSN 136 and the GGSN 138 carries both the GTP-C and the GTP-U. While not shown in FIG. 1C, the Gn interface may also be used by a Domain Name System (DNS). The GGSN 138 may be connected to the Internet/PSTN 170, via a Gi interface with IP protocols either directly or through a Wireless Application Protocol (WAP) gateway.

The GSM/UMTS core network 103 further includes a CS-MGW 134 coupled to an MSC 130. The CS-MGW 134 performs voice encoding of a CS call from a UE 105, such as an eCall over CS. As noted above with reference to FIG. 1A, the MSC 130 may perform switching functions for CS calls and may also route SMS messages. The CS-MGW 134, the MSC 130, and the SGSN 136 may each interface with a BSC 118 for GERAN 121-1 and/or to RNC 128 for UTRAN 121-2.

Still referring to FIG. 1C, the MSC 130 and CS-MGW 134 in the GSM/UMTS core network 103 may interface with a PSAP 160 (e.g., a legacy PSAP 160-*a*) either directly (not shown in FIG. 1C) or via Internet/PSTN 170. In addition, to enable a UE 105 to handover or perform intersystem change (a change from the RAT that the UE 105 is currently using/camped on to a different RAT) from the GERAN/UTRAN 121 and the GSM/UMTS core network 103 to the E-UTRAN 123 and EPC 101 and vice versa, the SGSN 136 of the GSM/UMTS core network 103 interfaces with the MME 172, serving gateway 115, and Home Subscriber Server (HSS) 144 of the EPC 101. Likewise, the GGSN 138 of the GSM/UMTS core network 103 interfaces with the IMS 182 of the EPC 101. In addition, the MSC 130 of the GSM/UMTS core network 103 interfaces with the HSS 144 and the MME 172 of the EPC 101. As is known in the art, the intercommunication of these components of the GSM/UMTS core network 103 and the EPC 101 permit a dual-RAT capable UE 105 to operate at times using the GERAN/UTRAN 121 and the GSM/UMTS core network 103 and at other times using the E-UTRAN 123 and the EPC 101, and to handover or perform intersystem change from the GERAN/UTRAN 121 and the GSM/UMTS core network 103 to the E-UTRAN 123 and the LTE network 101, and vice versa, as the location of the UE 105 changes.

The wireless communications system 100-*c* further includes a test/reconfiguration server 164 which may be connected to the home network 104 and/or to the Internet/PSTN 170. The test/reconfiguration server 164 may support a test call or session from UE 105 whose purpose is to test CS eCall and/or NG eCall capability in UE 105. The test/reconfiguration server 164 may also or instead support a reconfiguration call or session from UE 105 whose purpose is to reconfigure UE 105 (e.g., a USIM for UE 105) in association with support of eCall. For example, the reconfiguration could enable a UE 105 that was previously configured for eCall-only mode to support normal voice and data services for a user of UE 105. As will be described herein, a UE 105 operating in eCall-only mode may make periodic test or reconfiguration calls to the test/reconfiguration server 164.

Figure 2:
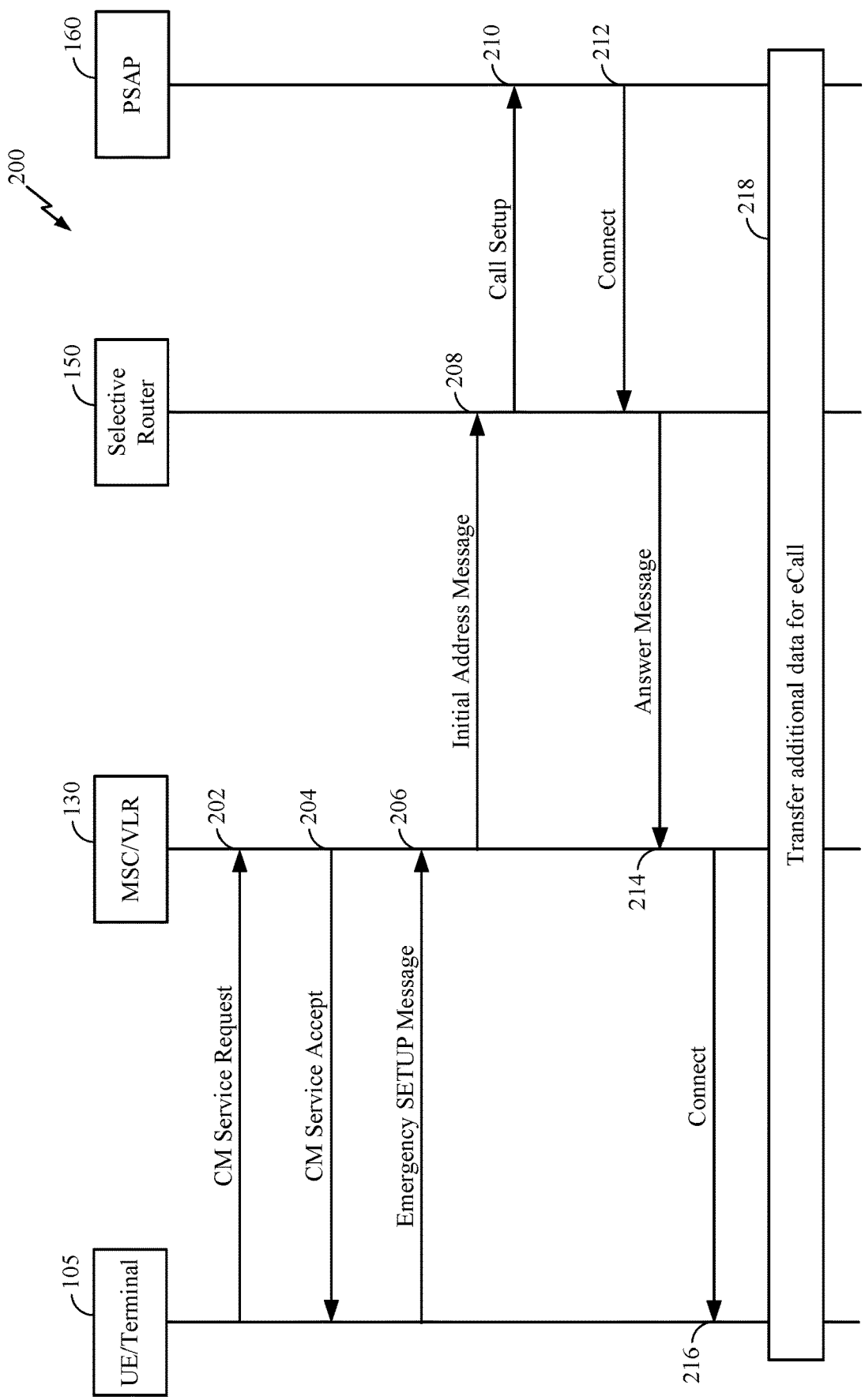
FIG. 2 illustrates an example message flow for establishing a CS eCall in accordance with various aspects of the present disclosure.

FIG. 2 illustrates an exemplary message flow 200 for establishing an eCall over CS by a UE 105, for the wireless communication system 100-*a* of FIG. 1A. The message flow 200 is also applicable to the communication system 100-*c* of FIG. 1C, for a UE with GSM access to GERAN 121-1 or UMTS access to UTRAN 121-2, when Internet/PSTN 170 in FIG. 1C includes the Selective Router 150. For simplicity, some network entities (e.g., RAN 120) and some less pertinent signaling messages are not shown in FIG. 2. At stage 202, UE 105 may initially acquire radio access to a serving base station (e.g., Node B 124, BTS 116, etc.) for GSM or UMTS access, and may send a Connection Management (CM) Service Request message to an MSC/VLR 130 to request service. At stage 204, the MSC/VLR 130 may receive the message and may respond with a CM Service Accept message. At stage 206, the UE 105 may send an Emergency SETUP message to originate an eCall over CS. At stage 208, the MSC/VLR 130 may receive the message sent at stage 206 and may send an ISUP Initial Address Message to selective router 150 to originate a call for UE 105. At stage 210, the selective router 150 may send a Call Setup message to PSAP 160 to establish the call for UE 105. At stage 212, the PSAP 160 may return a Connect message to selective router 150, which may then, at stage 214, return an ISUP Answer Message to the MSC/VLR 130. At stage 216, the MSC/VLR 130 may then return a Connect message to UE 105. As part of stages 212-216, a voice path may be established between UE 105 and PSAP 160 by UE 105, MSC 130, Selective Router 150 and PSAP 160. At stage 218, the UE 105 may transfer additional data for the eCall, such as MSD, to the PSAP 160 over the voice path using an in-band data modem as described previously herein. A user of UE 105 may then communicate with an operator for PSAP 160 using the voice path for the eCall.

As noted above, an eCall may be initiated automatically by UE 105 (e.g., due to a vehicle collision) or manually by a user (e.g., a vehicle occupant). In one design, UE 105 may provide an eCall indicator in the Emergency SETUP message sent at stage 206. The eCall indicator may convey that it is a Manually Initiated eCall (MIeC) (i.e., originated by the user), or that it is an Automatically Initiated eCall (AIeC) (i.e., originated by the UE 105).

The eCall indicator may be used by a wireless network (e.g., MSC 130) to differentiate the eCall from normal emergency calls, to filter or route the eCall to an appropriate PSAP (e.g., a PSAP equipped to receive eCalls), and/or for other purposes. The eCall indicator may be conveyed by UE 105 in various manners during emergency call setup. The eCall indicator may be sent in a CM Service Request message, an Emergency SETUP message, a SETUP message, or some other message sent by UE 105.

Figure 3:
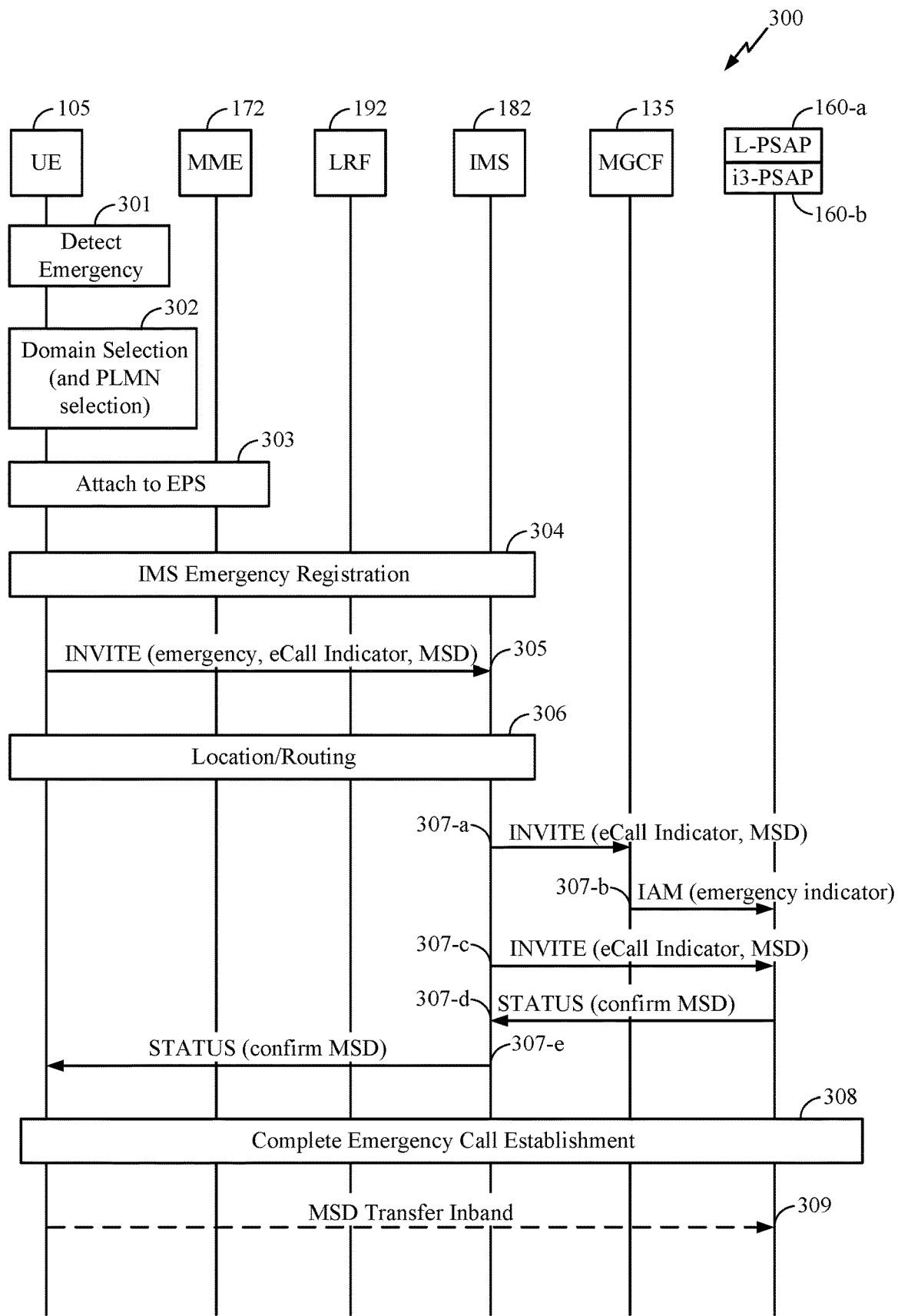
FIG. 3 illustrates an example message flow for establishing an NG eCall in accordance with various aspects of the present disclosure.

FIG. 3 shows an example message flow 300 illustrating how various components of wireless communication system 100-*b*, as discussed with reference to FIG. 1B, can establish an eCall over IMS in accordance with aspects of the current disclosure. Here, some principal elements, but not all elements, of the EPC 101 are shown. The message flow 300 is also applicable to the communication system 100-*c* of FIG. 1C for a UE 105 with LTE access to E-UTRAN 123. Some actions attributed to or implied for certain elements or certain groups of elements of the EPC 101 shown in FIG. 3 may be supported in part by other elements of EPC 101 not shown in FIG. 3. For example, references to actions performed by or involving MME 172 can be assisted or provided by the eNB 110, Serving Gateway 115, PDN Gateway 122, and/or other components of EPC 101 shown in FIG. 1B, and the IMS 182 in FIG. 3 can refer to the P-CSCF 126 and/or the E-CSCF 132 of FIG. 1B, or may correspond to all the elements of the IMS 182 of FIG. 1B. As mentioned previously, techniques disclosed herein are not necessarily limited to the architecture illustrated in FIG. 1B.

At stage 301, the IVS 107 (not shown in FIG. 3) detects an emergency situation either via manual user input (e.g., a driver or passenger of a vehicle presses an emergency help button) or automatically using sensors (e.g., sensing an abrupt acceleration/deceleration, air-bag deployment, fire, water, etc.) and informs the UE 105.

At stage 302, the UE 105 performs domain selection to select either the CS or PS domain and find an accessible wireless network supporting this domain. If the CS domain is selected (not shown in FIG. 3), a CS eCall is instigated, as described for FIG. 2. If the PS domain is selected, as shown in FIG. 3, E-UTRAN 123 and EPC 101 are accessed and the rest of the operations in FIG. 3 are performed. In some cases, stage 302 may be skipped. For instance, if an eCall-based network selection procedure occurs prior to the establishment of the eCall, and if the current PLMN/access technology combination supports eCall (e.g., eCall over IMS, eCall over CS, etc.).

At stage 303, UE 105 attaches to EPC 101 and E-UTRAN 123 if not already attached (e.g., if the UE 105 is configured for eCall-only mode and only attaches to a wireless network to instigate an eCall, test call, or call to a home network operator). The attachment at stage 303 is supported by MME 172 and by other elements not shown in FIG. 3, such as eNB 110 and PDN gateway 122. During the attachment at stage 303, UE 105 obtains an emergency bearer and discovers a P-CSCF 126 suitable for emergency services. The UE 105 may release resources (e.g., bearer resources) for any previous ongoing sessions if needed to perform this stage.

At stage 304, the UE 105 performs an IMS emergency registration with the IMS 182. The IMS emergency registration at stage 304 may also be performed with the IMS 182 in a home network 104 for the UE 105 (not shown in FIG. 3) if the UE 105 is roaming (e.g., if EPC 101 is not part of home network 104 for UE 105).

At stage 305, the UE 105 sends a SIP INVITE message to the IMS 182 (e.g., to the P-CSCF 126). The INVITE sent at stage 305 may contain an eCall indication, which may indicate an emergency call and whether the eCall was manually or automatically invoked, and telematics data that in this example comprises MSD. In an alternative aspect, the MSD may not be included in the SIP INVITE sent at stage 305 and UE 105 may instead attempt to send the telematics data (e.g., after the NG eCall is established) using alternative techniques, such as by using a separate data channel which may be established in parallel with or after establishment of the voice path during stage 308.

At stage 306, the IMS 182 (e.g., the E-CSCF 132) may query the LRF 192 to obtain call routing and/or location information for the UE 105 and the LRF 192 may obtain the location of the UE (e.g., via an interaction involving the MME 172 and/or UE 105) in order to provide call routing and/or location information.

At stages 307a-e, the IMS 182 (e.g., the E-CSCF 132) uses any routing information obtained in stage 306 (e.g., provided by LRF 192) or selects an emergency center or PSAP 160 based on information provided in stage 305 and sends the NG eCall request (e.g., SIP INVITE message) including the eCall indication, MSD and any location information obtained in stage 305 or stage 306 to or towards the emergency center or PSAP 160. If the emergency center or PSAP 160 is accessed over the CS domain (e.g., the PSAP 160 is a legacy PSAP 160-a), stages 307a and 307b are performed. For stage 307a, the SIP INVITE is sent to MGCF 135. For stage 307b, the MGCF 135 sends an ISUP Initial Address Message (IAM) towards the legacy PSAP 160-a (e.g., sends the IAM to the legacy ES network 145). The IAM may carry an emergency indication (e.g., in a Calling Party's Category parameter) and an eCall indication. In some implementations, the indication of an eCall or an indication of call routing to a PSAP 160 that supports eCall may be carried as part of a Called Party Number parameter (e.g., by including certain digits in the Called Party Number parameter) and may not be carried as a separate indication in the IAM. The MSD may be discarded by the MGCF 135 as part of stage 307b.

If the emergency center or PSAP 160 is accessed over the PS domain (e.g., the PSAP is i3 PSAP 160-b), stages 307c, 307d, and 307e are performed. For stage 307c, the IMS 182 (e.g., the E-CSCF 132) sends the SIP INVITE to or towards the i3 PSAP 160-b (e.g., via an IBCF and the i3 ESInet 155) carrying the eCall indication and the MSD. For stage 307d, the i3 PSAP 160-b returns a SIP STATUS message (e.g., a SIP 200 OK message) to the IMS 182 (e.g., to the E-CSCF 132 via an IBCF and the i3 ESInet 155). The SIP STATUS message carries a confirmation of MSD receipt and possibly an agreement to establish the NG eCall. For stage 307e, the IMS 182 (e.g., the E-CSCF 132 and P-CSCF 126) send the STATUS message to the UE 105, confirming receipt of the MSD and acceptance of the eCall. When the eCall is sent to the legacy PSAP 160-a over the CS domain as at stage 307a and stage 307b, a similar STATUS message, such as an ISUP Answer (ANM) message, may be sent by the legacy PSAP 160-a after stages 307a and 307b as part of stage 308. However, this STATUS message (e.g., ANM message) would not indicate confirmation of the transfer of the MSD because the MSD is not sent to the legacy PSAP 160-a at stages 307a and 307b.

At stage 308, the emergency call establishment is completed. This includes establishing a voice path (also referred to as a voice channel or audio channel) between the UE 105 and the PSAP (either legacy PSAP 160-a or i3 PSAP 160-b). In the case of an NG eCall to i3 PSAP 160-b, the voice path may employ VoIP and not need any conversion between different voice encodings. In the case of an NG eCall to legacy PSAP 160-a, the voice path may go through MGW 142 associated with the MGCF 135 and may also go through other entities as described for FIG. 1B and may undergo one or more transformations, such as conversion between VoIP encoding and CS voice encoding at MGW 142.

If the UE 105 does not receive the STATUS message at stage 307e (e.g., the NG eCall is sent to legacy PSAP 160-a via the CS domain at stages 307a and 307b) or if the STATUS message received at stage 307e does not contain a confirmation of successful MSD receipt by the PSAP (e.g., by legacy PSAP 160-a), then at stage 309, the UE 105 attempts to transfer the MSD to the emergency center or PSAP 160 via in-band means over the voice path established at stage 308, as mentioned previously. For example, in the case of an eCall to the legacy PSAP 160-a, the UE 105 may send the MSD over the voice path to the legacy PSAP 160-a without waiting for a request from the legacy PSAP 160-a or may wait for an in-band request from the legacy PSAP 160-a (sent over the voice path to the UE 105) before sending the MSD to the legacy PSAP 160-a over the voice path.

As noted above, when eCall was specified in Release 8, the only available version of eCall was eCall over CS. It was therefore assumed that a UE in eCall-only mode would only perform CS calls (either CS eCalls, or CS test/reconfiguration calls), and thus only CS-specific procedures were defined for UEs in eCall-only mode. When eCall over IMS was specified in Release 14, to address the fact that VoLTE coverage would not be available everywhere for quite some time still, and thus the UE may have to fall back to CS connectivity in certain areas, 3GPP mandated that a UE supporting eCall over IMS must also support eCall over CS.

It was acknowledged that such a UE may also perform inter-RAT mobility (e.g., a handover (HO), in either idle or connected mode, between an E-UTRAN (e.g., E-UTRAN 123) and a UTRAN (e.g., UTRAN 121-2) or GERAN (e.g., GERAN 121-1)). However, no consideration was given to mobility management procedures after inter-RAT mobility. This can result in the issues described in Table 2.

TABLE 2

| RAT Transition | UE State | Missing Specification Aspects | Consequence |
|---|---|---|---|
| E-UTRAN to UTRAN/GERAN | Connected mode - SRVCC HO of ongoing eCall | Routing Area Update (RAU) in UTRAN/GERAN after SRVCC HO is not specified by 3GPP TS 24.008 GPRS detach is not specified by 3GPP TS 24.008 | UE will not be reachable for a call back from the PSAP after the eCall is released in UTRAN/GERAN UE will not be able to detach for the PS domain once eCall inactivity timer expires |
| E-UTRAN to UTRAN/GERAN | Connected mode - PS HO of test/ reconfiguration call | RAU in UTRAN/GERAN after PS HO is not specified by 3GPP TS 24.008 timer T3243 (CS test/reconfiguration inactivity timer) is not started upon release of PS test/ reconfiguration call GPRS detach is not specified by 3GPP TS 24.008 | UE will not be reachable for a call back from the PSAP after the eCall is released in UTRAN/GERAN Detach will not be triggered UE will not be able to detach for the PS domain once eCall inactivity timer expires. |
| E-UTRAN to UTRAN/GERAN | Idle mode - while T3444 (PS eCall inactivity timer)/ T3445 (PS test/ reconfiguration call inactivity timer) is running | RAU in UTRAN/GERAN is not specified by 3GPP TS 24.008 Handling of timer T3444/T3445 upon E-UTRAN to UTRAN/GERAN mobility is not specified GPRS detach is not specified by 3GPP TS 24.008 | UE will not be reachable for a PSAP call back UE will not be able to trigger detach due to no eCall inactivity timer running UE will not be able to detach for the PS domain |
| UTRAN/GERAN to E-UTRAN | Connected mode - ongoing eCall | Not applicable (CS to PS SRVCC HO is not supported even for normal emergency calls) | Not applicable |
| UTRAN/GERAN to E-UTRAN | Connected mode - CS to PS SRVCC of ongoing test/ reconfiguration call | Combined attach in UTRAN/GERAN is not specified by 3GPP TS 24.008 | Network cannot initiate CS to PS SRVCC handover |
| UTRAN/GERAN to E-UTRAN | Idle mode - while timer T3242/T3243 is running | Handling of timer T3242/T3243 is not specified | UE will not be triggered to detach for the CS and the PS domain once eCall inactivity timer expires |

It is noted that GERAN access is also referred to as A/Gb mode or GERAN mode; UMTS access is also referred to as Iu mode, or UTRAN mode; and E-UTRAN access is also referred to as LTE access, E-UTRAN mode, S1 mode, or S1 access.

To enable full inter-RAT mobility for a UE in eCall-only mode capable of eCall over IMS and CS eCall, the following specification changes, labelled L1 to L7 below, to 3GPP TS 24.008 (incorporated by reference herein in its entirety) may be added.

L1. Define a new GPRS Mobility Management (GMM) eCall inactivity procedure to trigger a combined GPRS detach for GPRS and non-GPRS service when timer T3242/T3243 (timer used to trigger eCall inactivity procedure when connected to a UTRAN/GERAN) expires at a UE in eCall-only mode capable of eCall over IMS after the UE has performed an inter-system change from LTE/EPC to UTRAN/GERAN. A "combined" GPRS Detach procedure detaches the UE (e.g., UE 105) for both CS services and PS services with the GSM/UMTS core network (e.g., GSM/UMTS core network 103).

L2. Specify that a UE in eCall-only mode that performs an inter-system change from LTE/EPC to UTRAN/GERAN mode with timer T3444/T3445 (timer used to trigger eCall inactivity procedure when connected to an LTE network) running shall stop timer T3444/T3445 and shall start timer T3242/T3243 with the time that was left on timer T3444/T3445.

L3. Specify that a UE in eCall-only mode shall start timer T3243 upon release of a PS signalling connection established due to handover of a test/reconfiguration call from E-UTRAN to UTRAN.

L4. Specify that a UE in eCall-only mode shall start timer T3243 upon expiration of the READY timer when the READY timer was started following handover of a test/reconfiguration call from E-UTRAN to GERAN.

L5. Remove the restriction that "An eCall only mobile station shall not perform a normal or combined GPRS attach procedure" for UEs capable of eCall over IMS. A "combined" attach procedure means that the UE registers for both CS and PS services with the GSM/UMTS core network (e.g., GSM/UMTS core network 103).

L6. Remove the restriction that "An eCall only mobile station shall not perform any kind of GPRS detach procedure" for UEs capable of eCall over IMS.

L7. Remove the restriction that "An eCall only mobile station shall not perform a normal or combined routing area updating procedure (RAU)" for UEs capable of eCall over IMS. A "combined RAU" is a registration update for both PS and CS services on the GSM/UMTS core network (e.g., GSM/UMTS core network 103).

In addition to the changes to L1-L7 above, the specification 3GPP TS 24.301 may be amended by specifying that a UE in eCall-only mode that performs an inter-system change from UTRAN/GERAN to LTE/EPC mode with timer T34242/T3243 running shall stop timer T3242/T3243 and shall start timer T3444/T3445 with the time that was left on timer T3242/T3243.

Figure 4:
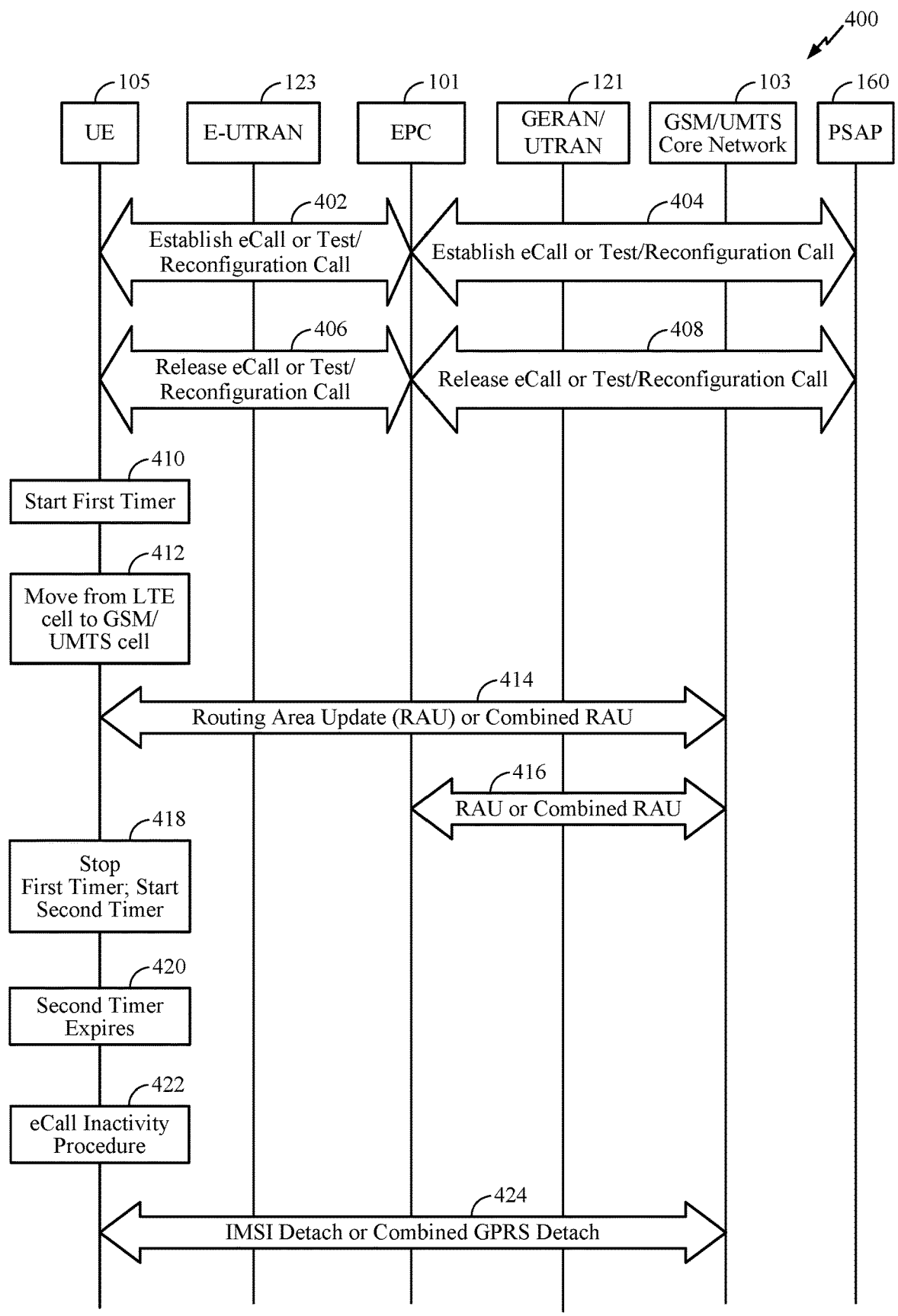
FIG. 4 is an exemplary flow illustrating intersystem change of a UE from an LTE cell to a GSM/UMTS cell while the UE is in idle mode according to at least one aspect of the disclosure.

Table 3 illustrates the proposed 3GPP solutions for the inter-RAT scenarios illustrated in Table 2.

flow 400, the UE 105 is assumed to be configured for eCall-only mode. FIG. 4 is applicable to the communication system 100-*c* of FIG. 1C and makes reference to certain elements described previously for FIG. 1C. In the example of FIG. 4, the UE 105 is initially able to access (e.g., may be camped on) an E-UTRAN 123 (comprising, e.g., an eNodeB 110).

At stage 402, the UE 105 establishes an eCall over IMS or a test/reconfiguration call via signaling interaction with the EPC 101. At stage 404, the EPC 101 establishes the eCall or test/reconfiguration call via signaling interaction with an appropriate PSAP 160 or test/reconfiguration server 164 (not shown in FIG. 4). Signaling interaction between the UE 105 and the PSAP 160 or test/reconfiguration server 164 can also occur as part of stage 402 and/or 404. The establishment of an eCall over IMS, such as performed at stages 402 and 404, was described in detail with regard to FIG. 3. The establishment of a test/reconfiguration call at stages 402 and 404 may use well-known call establishment procedures for LTE access such as those described in 3GPP TSs 23.401 and 23.228 (incorporated by reference herein in their entirety). At stage 406 and 408, the eCall or test/reconfiguration call is released.

TABLE 3

| RAT Transition | UE State | Proposed 3GPP Solution |
| --- | --- | --- |
| E-UTRAN to UTRAN/GERAN | Connected mode - SRVCC HO of ongoing eCall | Allow RAU for UE in eCall-only mode if UE is capable of eCall over IMS Allow GPRS detach for UE in eCall-only mode if UE is capable of eCall over IMS |
| E-UTRAN to UTRAN/GERAN | Connected mode - PS HO of test/reconfiguration call | Allow RAU for UE in eCall-only mode if UE is capable of eCall over IMS Start timer T3243 upon release of PS test/reconfiguration call Allow GPRS detach for UE in eCall-only mode if UE is capable of eCall over IMS |
| E-UTRAN to UTRAN/GERAN | Idle mode - while timer T3444 (PS eCall inactivity timer)/T3445 (PS test/reconfiguration call inactivity timer) is running | Allow RAU for UE in eCall-only mode if UE is capable of eCall over IMS. Start timer T3242/T3243 with the time left on timer T3444/T3445 upon idle mode E-UTRAN to UTRAN/GERAN transition Allow GPRS detach for UE in eCall-only mode if UE is capable of eCall over IMS |
| UTRAN/GERAN to E-UTRAN | Connected mode - ongoing eCall | Not Applicable |
| UTRAN/GERAN to E-UTRAN | Connected mode - CS to PS SRVCC of ongoing test/reconfiguration call | Allow combined GPRS attach for UE in eCall-only mode if UE is capable of eCall over IMS |
| UTRAN/GERAN to E-UTRAN | Idle mode - while timer T3242/T3243 is running | Start timer T3444/T3445 with the time left on timer T3242/T3243 upon idle mode UTRAN/GERAN to E-UTRAN transition |

FIG. 4 shows an exemplary signaling flow 400 illustrating an intersystem change of a UE 105 from an LTE cell to a GSM/UMTS cell while the UE 105 is in idle mode according to at least one aspect of the disclosure. For exemplary Upon release of the eCall or test/reconfiguration call, at stage 410, the UE 105 starts a first inactivity timer (e.g., timer T3444/T3445 as defined in 3GPP TS 24.301). At stage 412, the UE 105 moves from coverage for an LTE cell for E-UTRAN 123 to coverage for a GSM cell for GERAN 121-1 or a UMTS cell for UTRAN 121-2 and, as a result, the UE 105 performs intersystem change from E-UTRAN 123 and EPC 101 to GERAN/UTRAN 121 and GSM/UMTS core network 103. Because the intersystem change at stage 412 occurs after the release of the eCall or test/reconfiguration call and because the UE 105 operates in eCall-only mode, the intersystem change occurs while the UE 105 is in idle state. The intersystem change at stage 412 may trigger the UE 105 to perform, at stage 414, a RAU or a Combined RAU procedure as described in 3GPP TS 23.401. At stage 416, the GSM/UMTS core network 103 continues and completes the RAU or combined RAU procedure with the EPC 101.

At stage 418, in response to the RAU or combined RAU procedure at stages 414 and 416, the UE 105 stops the first inactivity timer (e.g., timer T3444/T3445) and starts a second inactivity timer (e.g., timer T3242/T3243 as defined in 3GPP TS 24.008). In an aspect, however, the UE 105 may stop the first inactivity timer and start the second inactivity timer immediately after the intersystem change at stage 412 and before it performs the RAU or combined RAU procedure at stages 414 and 416. The second inactivity timer may be started at stage 418 with a time value equal to the time remaining for the first inactivity timer prior to the first inactivity timer being stopped. At stage 420, the second inactivity timer (e.g., timer T3242/T3243) expires. In response, at stage 422, the UE 105 performs an eCall inactivity procedure. The eCall inactivity procedure may be performed when or after the second inactivity timer expires and the UE 105 is in at least one of a CS Idle state, a PS Not Registered state, a PS Null state, a PS registered state with a READY timer not running, a PS Registered Idle state, or any combination thereof. The READY timer may be a READY timer defined in 3GPP TS 24.008 that is used for GPRS access to detect when a UE 105 may be idle and no longer transmitting and receiving data traffic in PS mode. At stage 424, the UE 105 performs an IMSI detach or a combined GPRS Detach procedure with the GSM/UMTS core network 103.

Figure 5:
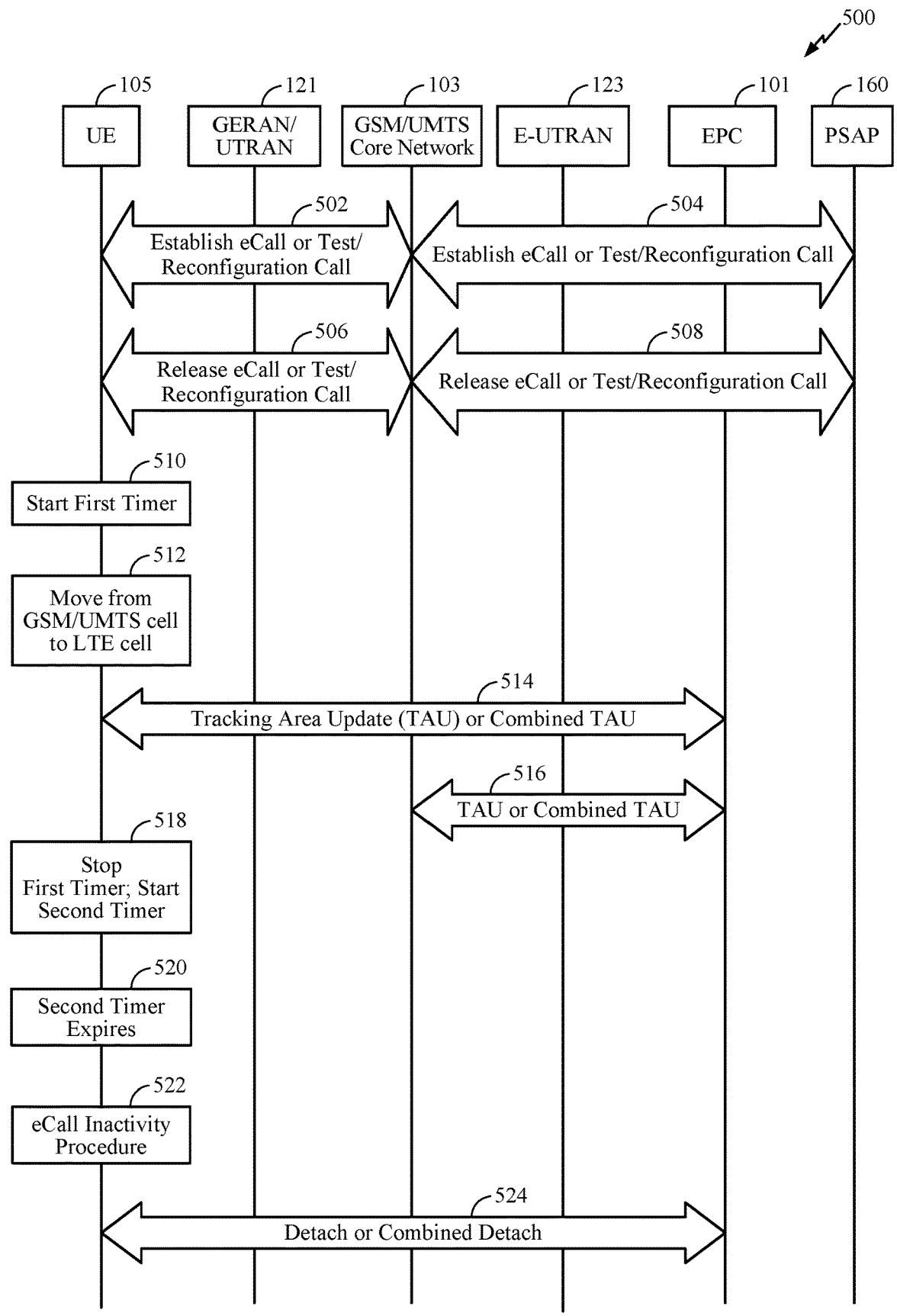
FIG. 5 is an exemplary flow illustrating intersystem change of a UE from a GSM/UMTS cell to an LTE cell while the UE is in idle mode according to at least one aspect of the disclosure.

FIG. 5 is an exemplary flow 500 illustrating an intersystem change of a UE 105 from a GSM/UMTS cell to an LTE cell while the UE 105 is in idle mode according to at least one aspect of the disclosure. For exemplary flow 500, the UE 105 is assumed to be configured for eCall-only mode. FIG. 5 is applicable to the communication system 100-c of FIG. 1C and makes reference to certain elements described previously for FIG. 1C. In the example of FIG. 5, the UE 105 is initially able to access (e.g., may be camped on) a GERAN 121-1 or UTRAN 121-2 (referred to collectively as GERAN/UTRAN 121).

At stage 502, the UE 105 establishes an eCall over CS or a CS test/reconfiguration call via signaling interaction with the GSM/UMTS core network 103. At stage 504, the GSM/UMTS core network 103 establishes the eCall or test/reconfiguration call via signaling interaction with an appropriate PSAP 160 or test/reconfiguration server 164 (not shown in FIG. 5). Signaling interaction between the UE 105 and the PSAP 160 or test/reconfiguration server 164 can also occur as part of stage 502 and/or 504. The establishment of an eCall over CS, such as performed during stages 502 and 504, was described in detail with regard to FIG. 2. The establishment of a CS test/reconfiguration call at stages 502 and 504 may use well-known call establishment procedures for GSM and UMTS CS access such as those described in 3GPP TSs 23.018 and 24.008 (incorporated by reference herein in their entirety). At stage 506 and 508, the eCall or test/reconfiguration call is released.

Upon release of the eCall or test/reconfiguration call, at stage 510, the UE 105 starts a first inactivity timer (e.g., timer T3242/T3243 as defined in 3GPP TS 24.008). At stage 512, the UE 105 moves from coverage for a GSM or UMTS cell for GERAN/UTRAN 121 to coverage for an LTE cell for E-UTRAN 123 and, as a result, performs intersystem change from GERAN/UTRAN 121 and GSM/UMTS core network 103 to E-UTRAN 123 and EPC 101. Because the intersystem change at stage 512 occurs after the release of the eCall or test/reconfiguration call and because the UE 105 operates in eCall-only mode, the intersystem change occurs while the UE 105 is in idle state. The intersystem change at stage 512 may trigger the UE 105 to perform a Tracking Area Update (TAU) or a Combined TAU procedure at stage 514, as described in 3GPP TS 23.401. At stage 516, the EPC 101 continues and completes the TAU or the combined TAU procedure with the GSM/UMTS core network 103. A "combined" TAU is a registration update for both PS and CS services on the EPC 101.

At stage 518, in response to performing the TAU or Combined TAU procedure at stages 514 and 516, the UE 105 stops the first inactivity timer (e.g., timer T3242/T3243) and starts a second inactivity timer (e.g., timer T3444/T3445 as defined in 3GPP TS 24.301). In an aspect, however, the UE 105 may stop the first inactivity timer and start the second inactivity timer immediately after the intersystem change at stage 512 and before it performs the TAU or Combined TAU procedure at stages 514 and 516. The second inactivity timer may be started at stage 518 with a time value equal to the time remaining for the first inactivity timer prior to the first inactivity timer being stopped. At stage 520, the second inactivity timer (e.g., timer T3444/T3445) expires. In response, at stage 522, the UE 105 performs an eCall inactivity procedure. The eCall inactivity procedure may be performed when or after the second inactivity timer expires and the UE 105 is in an idle state for LTE access. At stage 524, the UE 105 performs a Detach or combined Detach procedure with the EPC 101. A "combined" Detach procedure detaches the UE 105 for both CS services and PS services with the EPC 101.

Figure 6:
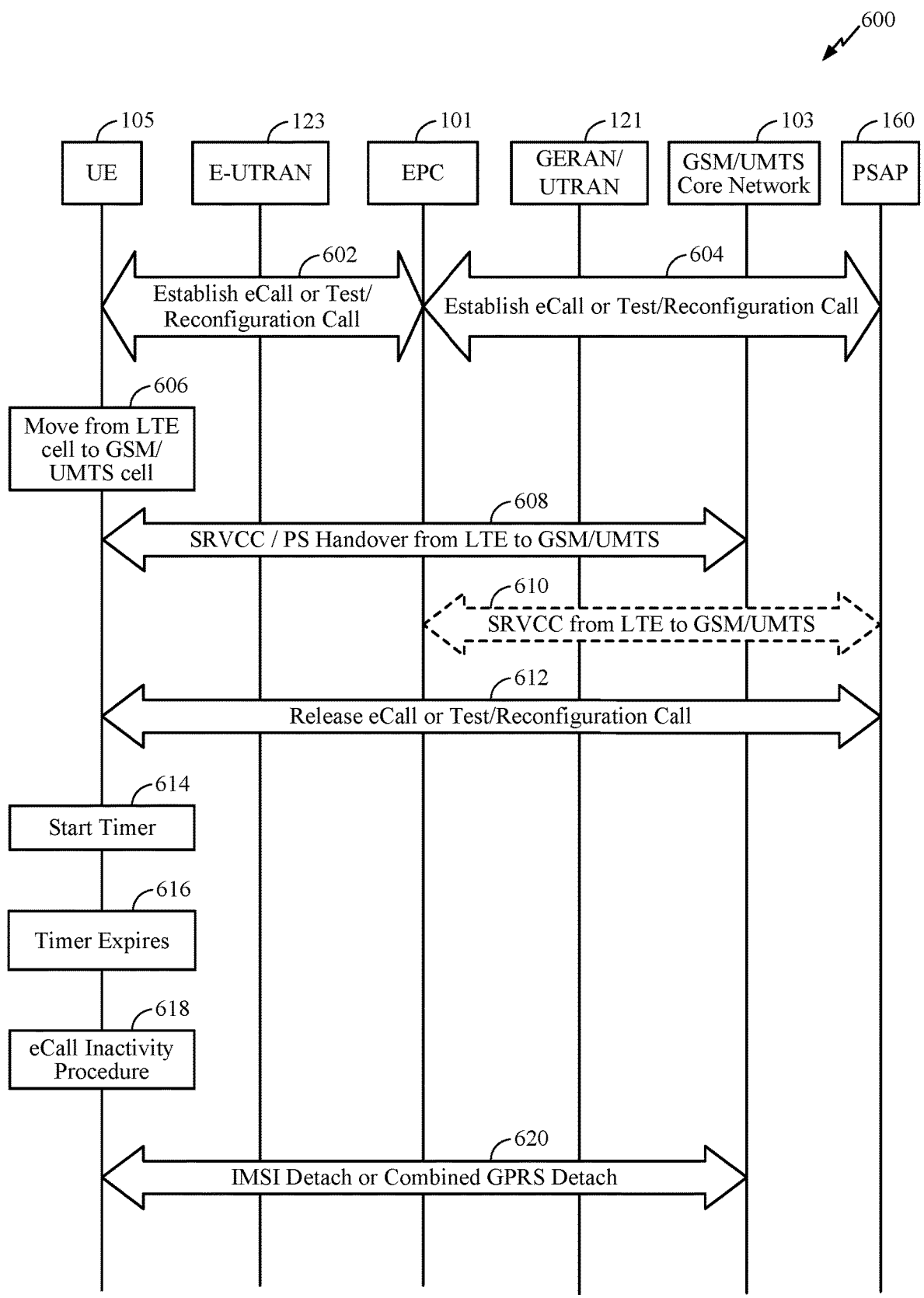
FIG. 6 is an exemplary flow illustrating a handover of a UE from an LTE cell to a GSM/UMTS cell while the UE is in connected mode according to at least one aspect of the disclosure.

FIG. 6 is an exemplary flow 600 illustrating a handover of a UE 105 from an LTE cell to a GSM/UMTS cell while the UE 105 is in connected mode according to at least one aspect of the disclosure. For exemplary flow 600, the UE 105 is assumed to be configured for eCall-only mode. FIG. 6 is applicable to the communication system 100-c of FIG. 1C and makes reference to certain elements described previously for FIG. 1C. In the example of FIG. 6, the UE 105 is initially able to access (e.g., may be camped on) an E-UTRAN 123 (comprising, e.g., an eNodeB 110).

At stage 602, the UE 105 establishes an eCall over IMS or a test/reconfiguration call via signaling interaction with the EPC 101. At stage 604, the EPC 101 establishes the eCall or test/reconfiguration call via signaling interaction with an appropriate PSAP 160 or test/reconfiguration server 164 (not shown in FIG. 6). Signaling interaction between the UE 105 and the PSAP 160 or test/reconfiguration server 164 can also occur as part of stage 602 and/or 604. The establishment of an eCall over IMS, such as performed during stages 602 and 604, was described in detail with regard to FIG. 3. The establishment of a test/reconfiguration call at stages 602 and 604 may use well-known call establishment procedures for LTE access such as those described in 3GPP TSs 23.401 and 23.228.

At stage 606, while the eCall or test/reconfiguration call is ongoing and the UE 105 is in connected mode, the UE 105 moves from coverage for an LTE cell for E-UTRAN 123 to coverage for a GSM cell for GERAN 121-1 or a UMTS cell for UTRAN 121-2. As a result, at stage 608, the UE 105 performs a handover from E-UTRAN 123 and EPC 101 to GERAN/UTRAN 121 and GSM/UMTS core network 103. The handover at stage 608 may include handover of a voice media path for the eCall or test/reconfiguration call to a CS domain for GERAN/UTRAN 121 and GSM/UMTS core network 103 using a SRVCC procedure as described in 3GPP TSs 23.237 and 23.216 (incorporated by reference herein in their entirety). The handover at stage 608 may also or instead include handover of other media paths (e.g., for text or Instant Messaging) and/or a data path for the eCall or test/reconfiguration call to a PS domain for GERAN/UTRAN 121 and GSM/UMTS core network 103 using a PS handover procedure as described in 3GPP TSs 23.216 and 23.401. If SRVCC is performed at stage 608 and if the PSAP 160 or test/reconfiguration server 164 is IP capable, then at stage 610, the EPC 101 may continue the SRVCC procedure with the PSAP 160 or test/reconfiguration server 164 by establishing a new voice media path for UE 105. At stage 612, the eCall or test/reconfiguration call is released.

Upon release of the eCall or test/reconfiguration call, at stage 614, the UE 105 starts an inactivity timer (e.g., timer T3242/T3243 as defined in 3GPP 24.008). The inactivity timer may be started at stage 614 based on release of a PS signaling connection for the eCall or test/reconfiguration call when the UE 105 has UMTS PS access to UTRAN 121-2 (condition 1). For example, the PS signaling connection may be released at or following stage 612 and may have been established as part of the PS handover procedure at stage 608. The inactivity timer may be started at stage 614 based on expiration of a READY timer when the UE has GPRS access to GERAN 121-1 and when the READY timer was started following the PS handover procedure at stage 608 (condition 2). The inactivity timer may be started at stage 614 based on release of a CS signaling connection for the eCall or test/reconfiguration call when the UE 105 has UMTS CS access to UTRAN 121-2 or GSM CS access to GERAN 121-1 (condition 3). The preceding condition 1, condition 2, and condition 3 for starting the inactivity timer may be independent with the inactivity timer being started when any one condition is fulfilled or may be dependent where the inactivity timer is only started when some combination of two or more conditions is fulfilled, At stage 616, the inactivity timer expires. In response to expiration of the inactivity timer at stage 616, at stage 618, the UE 105 performs an eCall inactivity procedure. If the UE 105 has UMTS access (e.g., to UTRAN 121-2), the eCall inactivity procedure may be performed when or after the inactivity timer expires and the UE 105 is in at least one of a CS Idle state, a PS Registered Idle state, a PS Not Registered state, a PS Null State, or any combination thereof. For example, if the UE 105 has UMTS access (e.g., to UTRAN 121-2), the eCall inactivity procedure may be performed when or after the inactivity timer expires and the UE 105 is in a CS Idle state and a PS Registered Idle state, or in a CS Idle state and a PS Not Registered state, or in a CS Idle state and a PS Null State. If the UE 105 has GSM-GPRS access (e.g., to GERAN 121-1), the eCall inactivity procedure may be performed when or after the inactivity timer expires and the UE 105 is in at least one of a CS Idle state, a PS Registered state with a READY timer not running, a PS Not Registered state, a PS Null State, or any combination thereof. For example, if the UE 105 has GSM-GPRS access (e.g., to GERAN 121-1), the eCall inactivity procedure may be performed when or after the inactivity timer expires and the UE 105 is in a CS Idle state and a PS Registered state with a READY timer not running, or in a CS Idle state and a PS Not Registered state, or in a CS Idle state and a PS Null State. The READY timer may be a READY timer defined in 3GPP TS 24.008 that is used for GPRS access to detect when a UE 105 may be idle and no longer transmitting and receiving data traffic in PS mode. At stage 620, the UE 105 performs an IMSI detach or a combined GPRS Detach procedure with the GSM/UMTS core network 103.

Figure 7:
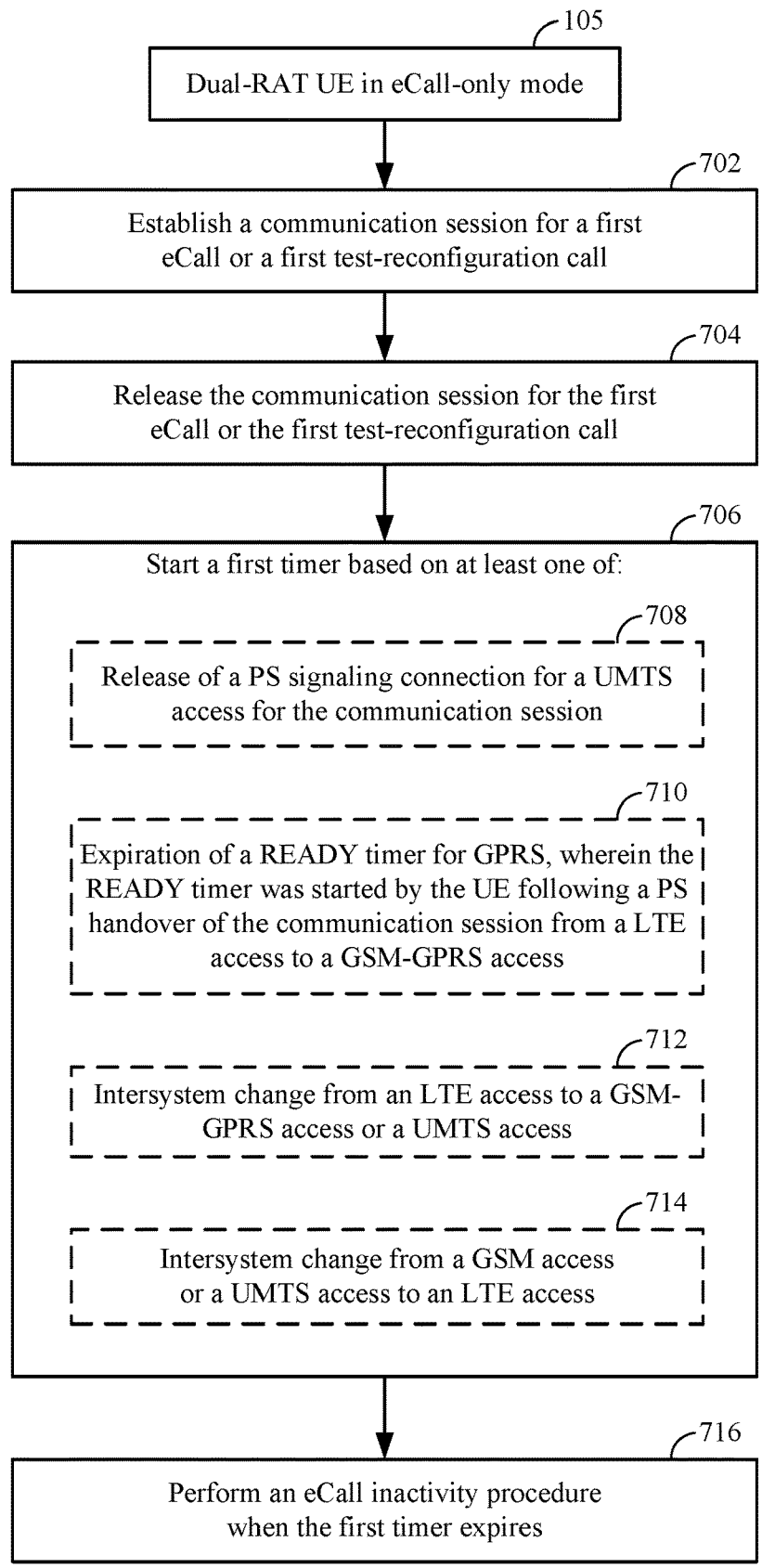
FIG. 7 illustrates an exemplary method for supporting inter-RAT mobility of a UE in an eCall-only mode according to at least one aspect of the disclosure.

FIG. 7 illustrates an exemplary method for supporting inter-RAT mobility of a UE 105 in an eCall-only mode according to at least one aspect of the disclosure. At block 702, the UE 105 (e.g., a communication device of the UE 105, optionally as directed by an eCall mobility management module, as described below with reference to FIG. 8) establishes a communication session for a first eCall or a first test/reconfiguration call, as described above with reference to stages 402 and 404 of FIG. 4, stages 502 and 504 of FIG. 5, and stages 602 and 604 of FIG. 6. At block 704, the UE 105 (e.g., a communication device of the UE 105, optionally as directed by an eCall mobility management module, as described below with reference to FIG. 8) releases the communication session for the first eCall or the first test/reconfiguration call, as described above with reference to stages 406 and 408 of FIG. 4, stages 506 and 508 of FIG. 5, and stage 612 of FIG. 6.

At block 706, the UE 105 (e.g., a communication device or a processing system of the UE 105, optionally as directed by an eCall mobility management module, as described below with reference to FIG. 8) starts a first timer. Starting the first timer may be based on at least one of: (block 708) release, by the UE 105, of a PS signaling connection for a UMTS access for the communication session; (block 710) expiration at the UE 105 of a READY timer for GPRS, where the READY timer was started by the UE 105 following a PS handover of the communication session from an LTE access to a GSM-GPRS access; (block 712) intersystem change by the UE 105 from an LTE access to a GSM-GPRS access or a UMTS access; or (block 714) intersystem change by the UE 105 from a GSM access or a UMTS access to an LTE access. Block 708 and block 710 may each correspond to stage 614 of exemplary flow 600. Block 712 may correspond to stage 418 of exemplary flow 400. Block 714 may correspond to stage 518 of exemplary flow 500.

At block 716, the UE 105 (e.g., a communication device of the UE 105, optionally as directed by an eCall mobility management module, as described below with reference to FIG. 8) performs an eCall inactivity procedure when the first timer expires, as described above with reference to stage 422 of FIG. 4, stage 522 of FIG. 5, and stage 618 of FIG. 6. The eCall inactivity procedure may include detaching from a wireless network and refraining from transmitting signaling to the wireless network in the absence of a second eCall or a second test/reconfiguration call. Detaching from the wireless network may correspond to stage 424 in FIG. 4, stage 524 in FIG. 5 or stage 620 in FIG. 6.

In an aspect, where starting the first timer at block 706 is based on the release of the PS signaling connection for the UMTS access for the communication session (block 708), the method 700 further includes establishing, by the UE 105, the communication session at block 702 using an LTE access (as described above with reference to stage 602 and stage 604 of FIG. 6), performing, by the UE 105, a handover of the communication session from the LTE access to the UMTS access (as described above with reference to stages 606-610 of FIG. 6), and releasing, by the UE 105, the communication session using the UMTS access (as described above with reference to stage 612 of FIG. 6). In this aspect, performing the eCall inactivity procedure at block 716 may include performing the eCall inactivity procedure when or after the first timer expires and the UE is in at least one of a CS Idle state, a PS Registered Idle state, a PS Not Registered state, a PS Null State, or any combination thereof for the UMTS access. Also in this aspect, detaching from the wireless network at block 716 may include performing an IMSI Detach or a combined GPRS Detach.

In an aspect, where starting the first timer at block 706 is based on the expiration of the READY timer for GPRS (block 710), the method 700 further includes establishing, by the UE 105, the communication session at block 702 using an LTE access (as described above with reference to stage 602 of FIG. 6), performing, by the UE 105, the PS handover of the communication session from the LTE access to the GSM-GPRS access (as described above with reference to stages 606-610 of FIG. 6), and releasing, by the UE 105, the communication session using the GSM-GPRS access (as described above with reference to stage 612 of FIG. 6). In this aspect, performing the eCall inactivity procedure at block 716 may include performing the eCall inactivity procedure when or after the first timer expires and the UE 105 is in at least one of a CS Idle state, a PS Registered state with a READY timer not running, a PS Not Registered state, a PS Null State, or any combination thereof for the GSM-GPRS access. Also in this aspect, detaching from the wireless network at block 716 may include performing an IMSI Detach or a combined GPRS Detach.

In an aspect, where starting the first timer at block 706 is based on the intersystem change from the LTE access to the GSM-GPRS access or the UMTS access (block 712), the method 700 further includes establishing, by the UE 105, the communication session at block 702 using the LTE access (as described above with reference to stage 402 and stage 404 of FIG. 4), releasing, by the UE 105, the communication session using the LTE access (as described above with reference to stage 406 and stage 408 of FIG. 4), starting, by the UE 105, a second timer based on the release of the communication session using the LTE access (as described above with reference to stage 410 of FIG. 4), performing, by the UE 105, the intersystem change from the LTE access to the GSM-GPRS access or the UMTS access (as described above with reference to stages 412-416 of FIG. 4), starting, by the UE 105, the first timer with a time left on the second timer following the intersystem change from the LTE access to the GSM-GPRS access or the UMTS access (as described above with reference to stage 418 of FIG. 4), and stopping, by the UE 105, the second timer (as described above with reference to stage 418 of FIG. 4). In this aspect, performing the eCall inactivity procedure at block 716 may include performing the eCall inactivity procedure when or after the first timer expires and the UE 105 is in at least one of a CS Idle state, a PS Not Registered state, a PS Null state, a PS registered state with a READY timer not running, a PS Registered Idle state, or any combination thereof. Also in this aspect, detaching from the wireless network at block 716 may include performing an IMSI Detach or a combined GPRS Detach.

In an aspect, where starting the first timer at block 706 is based on the intersystem change from the GSM access or the UMTS access to the LTE access (block 714), the method 700 further includes establishing, by the UE 105, the communication session at block 702 using the GSM access or the UMTS access (as described above with reference to stage 502 and stage 504 of FIG. 5), releasing, by the UE 105, the communication session using the GSM access or the UMTS access (as described above with reference to stage 506 and stage 508 of FIG. 5), starting, by the UE 105, a second timer based on release of the communication session using the GSM access or the UMTS access (as described above with reference to 510 of FIG. 5), performing, by the UE 105, the intersystem change from the GSM access or the UMTS access to the LTE access (as described above with reference to stages 512-516 of FIG. 5), starting, by the UE 105, the first timer with a time left on the second timer following the intersystem change from the GSM access or the UMTS access to the LTE access (as described above with reference to stage 518 of FIG. 5), and stopping, by the UE 105, the second timer (as described above with reference to stage 518 of FIG. 5). In this aspect, performing the eCall inactivity procedure at block 716 may include performing the eCall inactivity procedure when or after the first timer expires and the UE is in an Idle state for the LTE access. Also in this aspect, detaching from the wireless network at block 716 may include performing a Detach or a Combined Detach.

Figure 8:
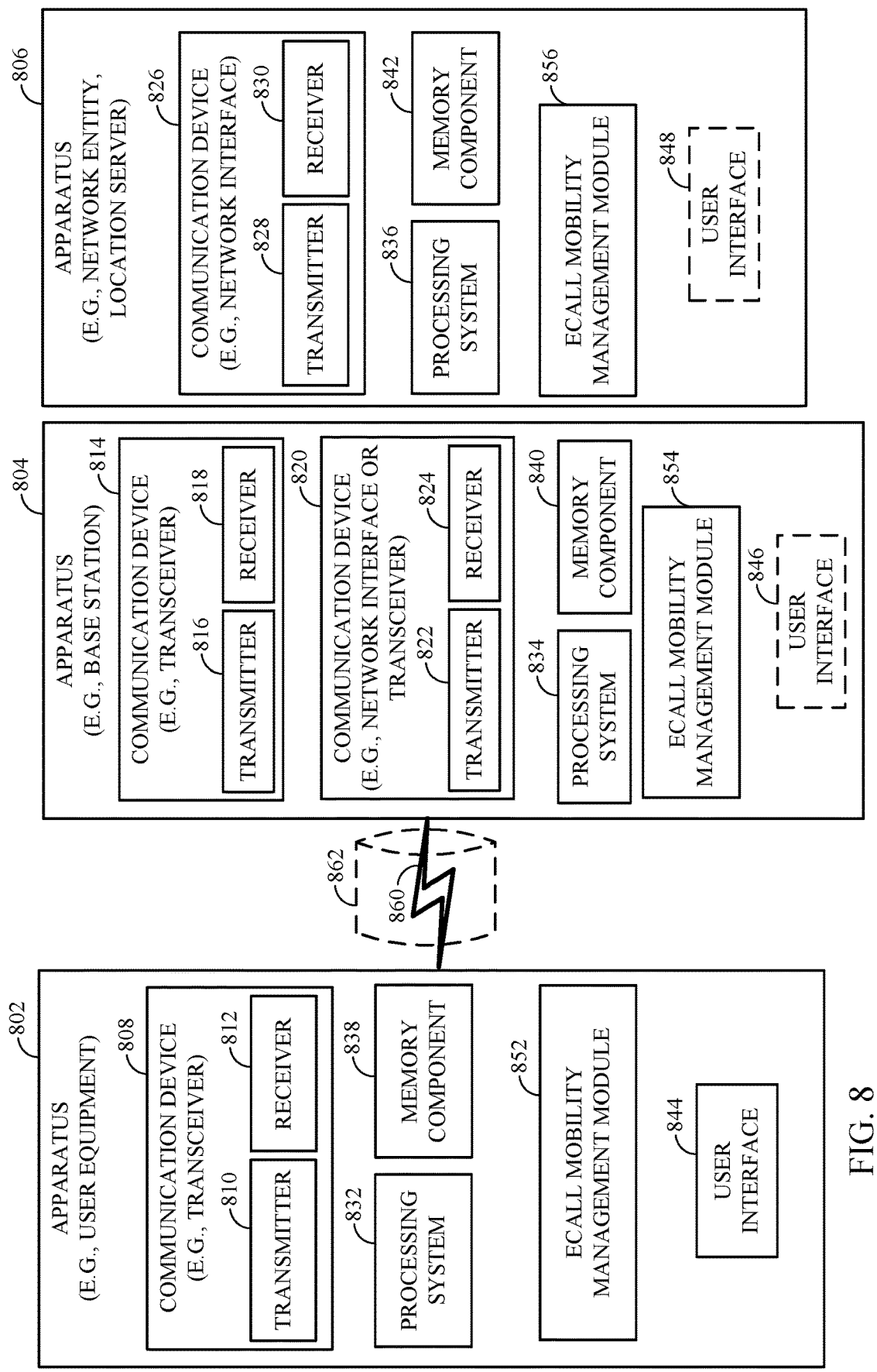
FIG. 8 is a simplified block diagram of several sample aspects of components that may be employed in wireless communication nodes and configured to support communication as taught herein.

FIG. 8 illustrates several sample components (represented by corresponding blocks) that may be incorporated into an apparatus 802, an apparatus 804, and an apparatus 806 (corresponding to, for example, a UE, a base station (e.g., a Node B or an eNodeB), and a network entity (e.g., a component of the LTE/EPC network 101, the GSM/UMTS network 103, etc.), respectively) to support the operations disclosed herein. As an example, the apparatus 802 may correspond to a UE 105, the apparatus 804 may correspond to any of Node Bs 124 or eNodeBs 110, and the apparatus 806 may correspond to a BTS 116, CS-MGW 134, a MSC 130, an RNC 128, an SGSN 136, a GGSN 138, an HSS 144, an MME 172, a serving gateway 115, a PDN gateway 122, a test/reconfiguration server 164, etc. It will be appreciated that the components may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 802 and the apparatus 804 each include at least one wireless communication device (represented by the communication devices 808 and 814) for communicating with other nodes via at least one designated RAT (e.g., LTE). Each communication device 808 includes at least one transmitter (represented by the transmitter 810) for transmitting and encoding signals (e.g., messages, indications, information, and so on) and at least one receiver (represented by the receiver 812) for receiving and decoding signals (e.g., messages, indications, information, pilots, and so on). Similarly, each communication device 814 includes at least one transmitter (represented by the transmitter 816) for transmitting signals (e.g., messages, indications, information, pilots, and so on) and at least one receiver (represented by the receiver 818) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 804 may also comprise a Network Listen Module (NLM) or the like for performing various measurements.

The apparatus 804 and the apparatus 806 include at least one communication device (represented by the communication device 820 and the communication device 826) for communicating with other nodes. For example, the communication device 826 may comprise a network interface that is configured to communicate with one or more network entities via a wire-based or wireless backhaul connection. In some aspects, the communication device 826 may be implemented as a transceiver configured to support wire-based or wireless signal communication. This communication may involve, for example, sending and receiving: messages, parameters, or other types of information. Accordingly, in the example of FIG. 8, the communication device 826 is shown as comprising a transmitter 828 and a receiver 830. Similarly, the communication device 820 may comprise a network interface that is configured to communicate with one or more network entities via a wire-based or wireless backhaul. As with the communication device 826, the communication device 820 is shown as comprising a transmitter 822 and a receiver 824.

The apparatuses 802, 804, and 806 also include other components that may be used in conjunction with the operations as disclosed herein. The apparatus 802 includes a processing system 832 for providing the UE functionality disclosed herein and for providing other processing functionality. The apparatus 804 includes a processing system 834 for providing the base station functionality disclosed herein and for providing other processing functionality. The apparatus 806 includes a processing system 836 for providing the network entity functionality disclosed herein and for providing other processing functionality.

The apparatuses 802, 804, and 806 include memory components 838, 840, and 842 (e.g., each including a memory device), respectively, for maintaining information (e.g., information indicative of reserved resources, thresholds, parameters, and so on). In addition, the apparatuses 802, 804, and 806 include user interface devices 844, 846, and 848, respectively, for providing indications (e.g., audible and/or visual indications) to a user and/or for receiving user input (e.g., upon user actuation of a sensing device such a keypad, a touch screen, a microphone, and so on).

For convenience, the apparatuses 802, 804, and/or 806 are shown in FIG. 8 as including various components that may be configured according to the various examples described herein. It will be appreciated, however, that the illustrated blocks may have different functionality in different designs.

The components of FIG. 8 may be implemented in various ways. In some implementations, the components of FIG. 8 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 808, 832, 838, and 844 may be implemented by processor and memory component(s) of the apparatus 802 (e.g., by execution of appropriate code and/or by appropriate configuration of processor components). Similarly, some or all of the functionality represented by blocks 814, 820, 834, 840, and 846 may be implemented by processor and memory component(s) of the apparatus 804 (e.g., by execution of appropriate code and/or by appropriate configuration of processor components). Also, some or all of the functionality represented by blocks 826, 836, 842, and 848 may be implemented by processor and memory component(s) of the apparatus 806 (e.g., by execution of appropriate code and/or by appropriate configuration of processor components).

In an aspect, the apparatus 804 may correspond to a Node B 124 or an eNodeB 110. The apparatus 802 may transmit and receive messages via a wireless link 860 with the apparatus 804, the messages including information related to various types of communication (e.g., voice, data, multimedia services, associated control signaling, etc.). The wireless link 860 may operate over a communication medium of interest, shown by way of example in FIG. 8 as the medium 862. In general, the apparatus 802 and the apparatus 804 may operate via the wireless link 860 according to one or more RATs, such as LTE, GSM, UMTS, NR, etc., depending on the network in which they are deployed.

Apparatus 802 may also include an eCall mobility management module 852 that may be used to perform the UE-side techniques described herein. Apparatus 804 and 806 may each also include eCall mobility management modules 854 and 856, respectively, which may be used to perform the base station and network entity techniques described herein. In an aspect, the eCall mobility management modules 852, 854, and 856 may be software modules stored in memory components 838, 840, and 842, respectively, and executable by processing systems 832, 834, and 836, respectively, and/or communication devices 808, 814, 826, respectively, to cause the apparatuses 802, 804, and 806, respectively, to perform the operations described herein. Alternatively, the eCall mobility management modules 852, 854, and 856 may be hardware modules coupled to processing systems 832, 834, and 836, respectively, and/or communication devices 808, 814, 826, respectively, that perform the operations described herein. As yet another alternative, the eCall mobility management modules 852, 854, and 856 may be firmware modules that are a combination of hardware and software.

Thus, in an aspect, where the apparatus 802 corresponds to a UE 105, the eCall mobility management module 852 may perform, or execution of the eCall mobility management module 852 may cause the processing system 832 and/or the communication device 808 to perform, the UE operations described herein. For example, the eCall mobility management module 852 may perform, or cause the communication device 808 and/or the processing system 832 to perform, the operations described above with reference to FIG. 7.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, stages and algorithm steps described in connection with the aspects disclosed herein may be implemented as electronic hardware, computer software, or combinations of both. To clearly illustrate this interchangeability of hardware and software, various illustrative components, blocks, modules, circuits, stages and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for supporting inter-radio access technology (RAT) mobility of a user equipment (UE) in an eCall-only mode, comprising:
    establishing, by the UE, a communication session for a first eCall or a first test/reconfiguration call;
    releasing, by the UE, the communication session for the first eCall or the first test/reconfiguration call;
    starting, by the UE, a first timer based on at least one of (i) release, by the UE, of a Packet Switched (PS) signaling connection for a Universal Mobile Telecommunications Service (UMTS) access for the communication session, (ii) expiration at the UE of a READY timer for General Packet Radio Service (GPRS), wherein the READY timer was started by the UE following a PS handover of the communication session from a Long Term Evolution (LTE) access to a Global System for Mobile communication (GSM)-GPRS access, (iii) intersystem change by the UE from an LTE access to a GSM-GPRS access or a UMTS access, or (iv) intersystem change by the UE from a GSM access or a UMTS access to an LTE access; and
    performing, by the UE, an eCall inactivity procedure when the first timer expires, wherein the eCall inactivity procedure comprises detaching from a wireless network and refraining from transmitting signaling to the wireless network in the absence of a second eCall or a second test/reconfiguration call.

2. The method of claim 1, wherein the starting the first timer is based on the release of the PS signaling connection for the UMTS access for the communication session, the method further comprising:
    establishing, by the UE, the communication session using an LTE access;
    performing, by the UE, a handover of the communication session from the LTE access to the UMTS access; and
    releasing, by the UE, the communication session using the UMTS access.

3. The method of claim 2, wherein the performing the eCall inactivity procedure when the first timer expires comprises performing the eCall inactivity procedure when the first timer expires and the UE is in at least one of a Circuit Switched (CS) Idle state, a PS Registered Idle state, a PS Not Registered state, a PS Null State, or any combination thereof for the UMTS access.

4. The method of claim 3, wherein the detaching from the wireless network comprises performing an International Mobile Subscriber Identity (IMSI) Detach or a combined GPRS Detach.

5. The method of claim 1, wherein the starting the first timer is based on the expiration of the READY timer for GPRS, the method further comprising:
    establishing, by the UE, the communication session using an LTE access;
    performing, by the UE, the PS handover of the communication session from the LTE access to the GSM-GPRS access; and
    releasing, by the UE, the communication session using the GSM-GPRS access.

6. The method of claim 5, wherein the performing the eCall inactivity procedure when the first timer expires comprises performing the eCall inactivity procedure when the first timer expires and the UE is in at least one of a CS Idle state, a PS Registered state with a READY timer not running, a PS Not Registered state, a PS Null State, or any combination thereof for the GSM-GPRS access.

7. The method of claim 6, wherein the detaching from the wireless network comprises performing an IMSI Detach or a combined GPRS Detach.

8. The method of claim 1, wherein the starting the first timer is based on the intersystem change from the LTE access to the GSM-GPRS access or the UMTS access, the method further comprising:
    establishing, by the UE, the communication session using the LTE access;

releasing, by the UE, the communication session using the LTE access;

starting, by the UE, a second timer based on the release of the communication session using the LTE access;

performing, by the UE, the inter-system change from the LTE access to the GSM-GPRS access or the UMTS access;

starting, by the UE, the first timer with a time left on the second timer following the intersystem change from the LTE access to the GSM-GPRS access or the UMTS access; and stopping, by the UE, the second timer.

9. The method of claim 8, wherein the performing the eCall inactivity procedure when the first timer expires comprises performing the eCall inactivity procedure when the first timer expires and the UE is in at least one of a CS Idle state, a PS Not Registered state, a PS Null state, a PS registered state with a READY timer not running, a PS Registered Idle state, or any combination thereof.

10. The method of claim 9, wherein the detaching from the wireless network comprises performing an IMSI Detach or a combined GPRS Detach.

11. The method of claim 1, wherein the starting the first timer is based on the intersystem change from the GSM access or the UMTS access to the LTE access, the method further comprising:

establishing, by the UE, the communication session using the GSM access or the UMTS access;

releasing, by the UE, the communication session using the GSM access or the UMTS access;

starting, by the UE, a second timer based on release of the communication session using the GSM access or the UMTS access;

performing, by the UE, the inter-system change from the GSM access or the UMTS access to the LTE access;

starting, by the UE, the first timer with a time left on the second timer following the intersystem change from the GSM access or the UMTS access to the LTE access; and stopping, by the UE, the second timer.

12. The method of claim 11, wherein the performing the eCall inactivity procedure when the first timer expires comprises performing the eCall inactivity procedure when the first timer expires and the UE is in an idle state for the LTE access.

13. The method of claim 12, wherein the detaching from the wireless network comprises performing a Detach or a Combined Detach.

14. An apparatus for supporting inter-radio access technology (RAT) mobility of a user equipment (UE) in an eCall-only mode, comprising:

at least one processor of the UE configured to:
  establish a communication session for a first eCall or a first test/reconfiguration call;
  release the communication session for the first eCall or the first test/reconfiguration call;
  start a first timer based on at least one of (i) release, by the UE, of a Packet Switched (PS) signaling connection for a Universal Mobile Telecommunications Service (UMTS) access for the communication session, (ii) expiration at the UE of a READY timer for General Packet Radio Service (GPRS), wherein the READY timer was started by the UE following a PS handover of the communication session from an LTE access to a Global System for Mobile communication (GSM)-GPRS access, (iii) intersystem change by the UE from an LTE access to a GSM-GPRS access or a UMTS access, or (iv) intersystem change by the UE from a GSM access or a UMTS access to an LTE access; and
  perform an eCall inactivity procedure when the first timer expires, wherein the eCall inactivity procedure comprises detaching from a wireless network and refraining from transmitting signaling to the wireless network in the absence of a second eCall or a second test/reconfiguration call.

15. The apparatus of claim 14, wherein the at least one processor being configured to start the first timer is based on the release of the PS signaling connection for the UMTS access for the communication session, the at least one processor further configured to:

establish the communication session using an LTE access;

perform a handover of the communication session from the LTE access to the UMTS access; and release the communication session using the UMTS access.

16. The apparatus of claim 15, wherein the at least one processor being configured to perform the eCall inactivity procedure when the first timer expires comprises the at least one processor being configured to perform the eCall inactivity procedure when the first timer expires and the UE is in at least one of a Circuit Switched (CS) Idle state, a PS Registered Idle state, a PS Not Registered state, a PS Null State, or any combination thereof for the UMTS access.

17. The apparatus of claim 16, wherein the at least one processor being configured to detach from the wireless network comprises the at least one processor being configured to perform an IMSI Detach or a combined GPRS Detach.

18. The apparatus of claim 14, wherein the at least one processor being configured to start the first timer is based on the expiration of the READY timer for GPRS, the at least one processor further configured to:

establish the communication session using an LTE access;

perform the PS handover of the communication session from the LTE access to the GSM-GPRS access; and release the communication session using the GSM-GPRS access.

19. The apparatus of claim 18, wherein the at least one processor being configured to perform the eCall inactivity procedure when the first timer expires comprises the at least one processor being configured to perform the eCall inactivity procedure when the first timer expires and the UE is in at least one of a CS Idle state, a PS Registered state with a READY timer not running, a PS Not Registered state, a PS Null State, or any combination thereof for the GSM-GPRS access.

20. The apparatus of claim 19, wherein the at least one processor being configured to detach from the wireless network comprises the at least one processor being configured to perform an IMSI Detach or a combined GPRS Detach.

21. The apparatus of claim 14, wherein the at least one processor being configured to start the first timer is based on the intersystem change from the LTE access to the GSM-GPRS access or the UMTS access, the at least one processor further configured to:

establish the communication session using the LTE access;

release the communication session using the LTE access;

start a second timer based on the release of the communication session using the LTE access;

perform the inter-system change from the LTE access to the GSM-GPRS access or the UMTS access;

start the first timer with a time left on the second timer following the intersystem change from the LTE access to the GSM-GPRS access or the UMTS access; and stop the second timer.

22. The apparatus of claim 21, wherein the at least one processor being configured to perform the eCall inactivity procedure when the first timer expires comprises the at least one processor being configured to perform the eCall inactivity procedure when the first timer expires and the UE is in at least one of a CS Idle state, a PS Not Registered state, a PS Null state, a PS registered state with a READY timer not running, a PS Registered Idle state, or any combination thereof.

23. The apparatus of claim 22, wherein the at least one processor being configured to detach from the wireless network comprises the at least one processor being configured to perform an IMSI Detach or a combined GPRS Detach.

24. The apparatus of claim 14, wherein the at least one processor being configured to start the first timer is based on the intersystem change from the GSM access or the UMTS access to the LTE access, the at least one processor further configured to:

establish the communication session using the GSM access or the UMTS access;

release the communication session using the GSM access or the UMTS access;

start a second timer based on release of the communication session using the GSM access or the UMTS access;

perform the inter-system change from the GSM access or the UMTS access to the LTE access;

start the first timer with a time left on the second timer following the intersystem change from the GSM access or the UMTS access to the LTE access; and stop the second timer.

25. The apparatus of claim 24, wherein the at least one processor being configured to perform the eCall inactivity procedure when the first timer expires comprises the at least one processor being configured to perform the eCall inactivity procedure when the first timer expires and the UE is in an Idle state for the LTE access.

26. The apparatus of claim 25, wherein the at least one processor being configured to detach from the wireless network comprises the at least one processor being configured to perform a Detach or a Combined Detach.

27. A non-transitory computer-readable medium storing computer-executable instructions for supporting inter-radio access technology (RAT) mobility of a user equipment (UE) in an eCall-only mode, the computer-executable instructions comprising:

at least one instruction instructing the UE to establish a communication session for a first eCall or a first test/reconfiguration call;

at least one instruction instructing the UE to release the communication session for the first eCall or the first test/reconfiguration call;

at least one instruction instructing the UE to start a first timer based on at least one of (i) release, by the UE, of a Packet Switched (PS) signaling connection for a Universal Mobile Telecommunications Service (UMTS) access for the communication session, (ii) expiration at the UE of a READY timer for General Packet Radio Service (GPRS), wherein the READY timer was started by the UE following a PS handover of the communication session from an LTE access to a Global System for Mobile communication (GSM)-GPRS access, (iii) intersystem change by the UE from an LTE access to a GSM-GPRS access or a UMTS access, or (iv) intersystem change by the UE from a GSM access or a UMTS access to an LTE access; and at least one instruction instructing the UE to perform an eCall inactivity procedure when the first timer expires, wherein the eCall inactivity procedure comprises detaching from a wireless network and refraining from transmitting signaling to the wireless network in the absence of a second eCall or a second test/reconfiguration call.

28. The non-transitory computer-readable medium of claim 27, wherein the first timer is started based on the release of the PS signaling connection for the UMTS access for the communication session, the non-transitory computer-readable medium further comprising:

at least one instruction instructing the UE to establish the communication session using an LTE access;

at least one instruction instructing the UE to perform a handover of the communication session from the LTE access to the UMTS access; and at least one instruction instructing the UE to release the communication session using the UMTS access.

29. The non-transitory computer-readable medium of claim 28, wherein the at least one instruction instructing the UE to perform the eCall inactivity procedure when the first timer expires comprises at least one instruction instructing the UE to perform the eCall inactivity procedure when the first timer expires and the UE is in at least one of a Circuit Switched (CS) Idle state, a PS Registered Idle state, a PS Not Registered state, a PS Null State, or any combination thereof for the UMTS access.

30. The non-transitory computer-readable medium of claim 29, wherein the at least one instruction instructing the UE to detach from the wireless network comprises at least one instruction instructing the UE to perform an International Mobile Subscriber Identity (IMSI) Detach or a combined GPRS Detach.

31. The non-transitory computer-readable medium of claim 27, wherein the first timer is started based on the expiration of the READY timer for GPRS, the non-transitory computer-readable medium further comprising:

at least one instruction instructing the UE to establish the communication session using an LTE access;

at least one instruction instructing the UE to perform the PS handover of the communication session from the LTE access to the GSM-GPRS access; and at least one instruction instructing the UE to release the communication session using the GSM-GPRS access.

32. The non-transitory computer-readable medium of claim 31, wherein the at least one instruction instructing the UE to perform the eCall inactivity procedure when the first timer expires comprises at least one instruction instructing the UE to perform the eCall inactivity procedure when the first timer expires and the UE is in at least one of a CS Idle state, a PS Registered state with a READY timer not running, a PS Not Registered state, a PS Null State, or any combination thereof for the GSM-GPRS access.

33. The non-transitory computer-readable medium of claim 32, wherein the at least one instruction instructing the UE to detach from the wireless network comprises at least one instruction instructing the UE to perform an IMSI Detach or a combined GPRS Detach.

34. The non-transitory computer-readable medium of claim 27, wherein the first timer is started based on the intersystem change from the LTE access to the GSM-GPRS access or the UMTS access, the non-transitory computer-readable medium further comprising:
  at least one instruction instructing the UE to establish the communication session using the LTE access;
  at least one instruction instructing the UE to release the communication session using the LTE access;
  at least one instruction instructing the UE to start a second timer based on the release of the communication session using the LTE access;
  at least one instruction instructing the UE to perform the inter-system change from the LTE access to the GSM-GPRS access or the UMTS access;
  at least one instruction instructing the UE to start the first timer with a time left on the second timer following the intersystem change from the LTE access to the GSM-GPRS access or the UMTS access; and
  at least one instruction instructing the UE to stop the second timer.

35. The non-transitory computer-readable medium of claim 34, wherein the at least one instruction instructing the UE to perform the eCall inactivity procedure when the first timer expires comprises at least one instruction instructing the UE to perform the eCall inactivity procedure when the first timer expires and the UE is in at least one of a CS Idle state, a PS Not Registered state, a PS Null state, a PS registered state with a READY timer not running, a PS Registered Idle state, or any combination thereof.

36. The non-transitory computer-readable medium of claim 35, wherein the at least one instruction instructing the UE to detach from the wireless network comprises at least one instruction instructing the UE to perform an IMSI Detach or a combined GPRS Detach.

37. The non-transitory computer-readable medium of claim 27, wherein the first timer is started based on the intersystem change from the GSM access or the UMTS access to the LTE access, the non-transitory computer-readable medium further comprising:
  at least one instruction instructing the UE to establish the communication session using the GSM access or the UMTS access;
  at least one instruction instructing the UE to release the communication session using the GSM access or the UMTS access;
  at least one instruction instructing the UE to start a second timer based on release of the communication session using the GSM access or the UMTS access;
  at least one instruction instructing the UE to perform the inter-system change from the GSM access or the UMTS access to the LTE access;
  at least one instruction instructing the UE to start the first timer with a time left on the second timer following the intersystem change from the GSM access or the UMTS access to the LTE access; and
  at least one instruction instructing the UE to stop the second timer.

38. The non-transitory computer-readable medium of claim 37, wherein the at least one instruction instructing the UE to perform the eCall inactivity procedure when the first timer expires comprises at least one instruction instructing the UE to perform the eCall inactivity procedure when the first timer expires and the UE is in an idle state for the LTE access.

39. The non-transitory computer-readable medium of claim 38, wherein the at least one instruction instructing the UE to detach from the wireless network comprises at least one instruction instructing the UE to perform a Detach or a Combined Detach.

40. An apparatus for supporting inter-radio access technology (RAT) mobility of a user equipment (UE) in an eCall-only mode, comprising:
  means for establishing a communication session for a first eCall or a first test/reconfiguration call;
  means for releasing the communication session for the first eCall or the first test/reconfiguration call;
  means for starting a first timer based on at least one of (i) release, by the UE, of a Packet Switched (PS) signaling connection for a Universal Mobile Telecommunications Service (UMTS) access for the communication session, (ii) expiration at the UE of a READY timer for General Packet Radio Service (GPRS), wherein the READY timer was started by the UE following a PS handover of the communication session from an LTE access to a Global System for Mobile communication (GSM)-GPRS access, (iii) intersystem change by the UE from an LTE access to a GSM-GPRS access or a UMTS access, or (iv) intersystem change by the UE from a GSM access or a UMTS access to an LTE access; and
  means for performing an eCall inactivity procedure when the first timer expires, wherein the eCall inactivity procedure comprises detaching from a wireless network and refraining from transmitting signaling to the wireless network in the absence of a second eCall or a second test/reconfiguration call.

* * * * *